(12) United States Patent
Slobodyanskiy et al.

(10) Patent No.: US 10,480,792 B2
(45) Date of Patent: Nov. 19, 2019

(54) FUEL STAGING IN A GAS TURBINE ENGINE

(71) Applicants: General Electric Company, Schenectady, NY (US); ExxonMobil Upstream Research Company, Spring, TX (US)

(72) Inventors: Ilya Aleksandrovich Slobodyanskiy, Simpsonville, SC (US); Igor Petrovich Sidko, Moscow (RU); Derrick Walter Simons, Greer, SC (US)

(73) Assignees: General Electric Company, Schenectady, NY (US); ExxonMobil Upstream Research Company, Spring, TX (US)

( * ) Notice: Subject to any disclaimer, the term of this patent is extended or adjusted under 35 U.S.C. 154(b) by 700 days.

(21) Appl. No.: 15/059,143

(22) Filed: Mar. 2, 2016

(65) Prior Publication Data

US 2016/0258629 A1    Sep. 8, 2016

Related U.S. Application Data

(60) Provisional application No. 62/129,708, filed on Mar. 6, 2015.

(51) Int. Cl.
*F23R 3/34* (2006.01)
*F23R 3/28* (2006.01)
(Continued)

(52) U.S. Cl.
CPC ............... *F23R 3/286* (2013.01); *F02C 3/34* (2013.01); *F02C 9/26* (2013.01); *F23L 7/00* (2013.01);
(Continued)

(58) Field of Classification Search
CPC .......... F23R 3/002; F23R 3/283; F23R 3/286; F23R 3/34; F23R 3/346; F02C 7/222; F02C 9/26; F02C 9/28
See application file for complete search history.

(56) References Cited

U.S. PATENT DOCUMENTS 2,488,911 A   11/1949   Hepburn et al.
2,884,758 A   5/1959    Oberle
(Continued)

FOREIGN PATENT DOCUMENTS

| CA | 2231749 | 9/1998 |
| CA | 2645450 | 9/2007 |
| EP | 0770771 | 5/1997 |

(Continued)

OTHER PUBLICATIONS

EP Communication Pursuant to Article 94(3) EPC for European Application No. 16710587.3 dated Nov. 9, 2018; 6 Pages.
(Continued)

*Primary Examiner* — Todd E Manahan
*Assistant Examiner* — Eric W Linderman
(74) *Attorney, Agent, or Firm* — Fletcher Yoder, P.C.

(57) ABSTRACT

A gas turbine system includes a turbine combustor. The turbine combustor includes one or more first fuel injectors coupled to a head end of the turbine combustor and configured to deliver a first portion of a fuel to a first axial position of a combustion section of the turbine combustor. The turbine combustor also includes one or more second fuel injectors coupled to the turbine combustor axially downstream of the head end and configured to deliver a second portion of the fuel to a second axial position of the combustion section of the turbine combustor, the second axial position being downstream of the first axial position. The gas turbine system also includes a controller configured to deliver the first and the second portions of the fuel such that (Continued)

combustion of the fuel and oxidant within the overall combustion section of the turbine combustor is at a defined equivalence ratio.

13 Claims, 7 Drawing Sheets

(51) Int. Cl.
| | |
|---|---|
| *F02C 3/14* | (2006.01) |
| *F02C 7/22* | (2006.01) |
| *F02C 9/26* | (2006.01) |
| *F23L 7/00* | (2006.01) |
| *F23N 1/02* | (2006.01) |
| *F23N 5/00* | (2006.01) |
| *F02C 3/34* | (2006.01) |
| *F02C 9/28* | (2006.01) |
| *F23R 3/00* | (2006.01) |

(52) U.S. Cl.
CPC ............ *F23N 1/022* (2013.01); *F23N 5/003* (2013.01); *F23R 3/346* (2013.01); *F02C 7/222* (2013.01); *F02C 9/28* (2013.01); *F05D 2270/31* (2013.01); *F23L 2900/07002* (2013.01); *F23L 2900/07003* (2013.01); *F23R 3/002* (2013.01); *F23R 3/283* (2013.01); *F23R 3/34* (2013.01); *Y02E 20/16* (2013.01); *Y02T 50/677* (2013.01)

(56) References Cited

U.S. PATENT DOCUMENTS

| | | | |
|---|---|---|---|
| 3,631,672 A | 1/1972 | Gentile et al. | |
| 3,643,430 A | 2/1972 | Emory et al. | |
| 3,705,492 A | 12/1972 | Vickers | |
| 3,841,382 A | 10/1974 | Gravis et al. | |
| 3,949,548 A | 4/1976 | Lockwood | |
| 4,018,046 A | 4/1977 | Hurley | |
| 4,043,395 A | 8/1977 | Every et al. | |
| 4,050,239 A | 9/1977 | Kappler et al. | |
| 4,066,214 A | 1/1978 | Johnson | |
| 4,077,206 A | 3/1978 | Ayyagari | |
| 4,085,578 A | 4/1978 | Kydd | |
| 4,092,095 A | 5/1978 | Straitz | |
| 4,101,294 A | 7/1978 | Kimura | |
| 4,112,676 A | 9/1978 | DeCorso | |
| 4,117,671 A | 10/1978 | Neal et al. | |
| 4,160,640 A | 7/1979 | Maev et al. | |
| 4,165,609 A | 8/1979 | Rudolph | |
| 4,171,349 A | 10/1979 | Cucuiat et al. | |
| 4,192,139 A * | 3/1980 | Buchheim | F23R 3/30 |
| | | | 60/39.826 |
| 4,204,401 A | 5/1980 | Earnest | |
| 4,222,240 A | 9/1980 | Castellano | |
| 4,224,991 A | 9/1980 | Sowa et al. | |
| 4,236,378 A | 12/1980 | Vogt | |
| 4,253,301 A | 3/1981 | Vogt | |
| 4,271,664 A | 6/1981 | Earnest | |
| 4,292,801 A * | 10/1981 | Wilkes | F23R 3/34 |
| | | | 60/733 |
| 4,344,486 A | 8/1982 | Parrish | |
| 4,345,426 A | 8/1982 | Egnell et al. | |
| 4,352,269 A | 10/1982 | Dineen | |
| 4,380,895 A | 4/1983 | Adkins | |
| 4,399,652 A | 8/1983 | Cole et al. | |
| 4,414,334 A | 11/1983 | Hitzman | |
| 4,427,362 A * | 1/1984 | Dykema | F23C 6/045 |
| | | | 110/345 |
| 4,434,613 A | 3/1984 | Stahl | |
| 4,435,153 A | 3/1984 | Hashimoto et al. | |
| 4,442,665 A | 4/1984 | Fick et al. | |
| 4,445,842 A | 5/1984 | Syska | |
| 4,479,484 A | 10/1984 | Davis | |
| 4,480,985 A | 11/1984 | Davis | |
| 4,488,865 A | 12/1984 | Davis | |
| 4,498,288 A | 2/1985 | Vogt | |
| 4,498,289 A | 2/1985 | Osgerby | |
| 4,528,811 A | 7/1985 | Stahl | |
| 4,543,784 A | 10/1985 | Kirker | |
| 4,548,034 A | 10/1985 | Maguire | |
| 4,561,245 A | 12/1985 | Ball | |
| 4,569,310 A | 2/1986 | Davis | |
| 4,577,462 A | 3/1986 | Robertson | |
| 4,602,614 A | 7/1986 | Percival et al. | |
| 4,606,721 A | 8/1986 | Livingston | |
| 4,613,299 A | 9/1986 | Backheim | |
| 4,637,792 A | 1/1987 | Davis | |
| 4,651,712 A | 3/1987 | Davis | |
| 4,653,278 A | 3/1987 | Vinson et al. | |
| 4,681,678 A | 7/1987 | Leaseburge et al. | |
| 4,684,465 A | 8/1987 | Leaseburge et al. | |
| 4,753,666 A | 6/1988 | Pastor et al. | |
| 4,762,543 A | 8/1988 | Pantermuehl et al. | |
| 4,817,387 A | 4/1989 | Lashbrook | |
| 4,858,428 A | 8/1989 | Paul | |
| 4,893,468 A * | 1/1990 | Hines | F02C 3/30 |
| | | | 60/39.17 |
| 4,895,710 A | 1/1990 | Hartmann et al. | |
| 4,898,001 A | 2/1990 | Kuroda et al. | |
| 4,910,957 A * | 3/1990 | Moreno | F02C 3/14 |
| | | | 60/737 |
| 4,946,597 A | 8/1990 | Sury | |
| 4,976,100 A | 12/1990 | Lee | |
| 5,014,785 A | 5/1991 | Puri et al. | |
| 5,044,932 A | 9/1991 | Martin et al. | |
| 5,047,220 A * | 9/1991 | Polcer | B01D 53/8625 |
| | | | 423/239.1 |
| 5,073,105 A | 12/1991 | Martin et al. | |
| 5,084,438 A | 1/1992 | Matsubara et al. | |
| 5,085,274 A | 2/1992 | Puri et al. | |
| 5,097,659 A * | 3/1992 | Lampe | F02C 7/277 |
| | | | 60/39.27 |
| 5,098,282 A | 3/1992 | Schwartz et al. | |
| 5,123,248 A | 6/1992 | Monty et al. | |
| 5,135,387 A | 8/1992 | Martin et al. | |
| 5,141,049 A | 8/1992 | Larsen et al. | |
| 5,142,866 A | 9/1992 | Yanagihara et al. | |
| 5,147,111 A | 9/1992 | Montgomery | |
| 5,154,596 A | 10/1992 | Schwartz et al. | |
| 5,183,232 A | 2/1993 | Gale | |
| 5,195,884 A | 3/1993 | Schwartz et al. | |
| 5,197,289 A | 3/1993 | Glevicky et al. | |
| 5,199,255 A * | 4/1993 | Sun | B01D 53/56 |
| | | | 60/772 |
| 5,238,395 A | 8/1993 | Schwartz et al. | |
| 5,255,506 A | 10/1993 | Wilkes et al. | |
| 5,265,410 A | 11/1993 | Hisatome | |
| 5,271,905 A | 12/1993 | Owen et al. | |
| 5,275,552 A | 1/1994 | Schwartz et al. | |
| 5,295,350 A | 3/1994 | Child et al. | |
| 5,304,362 A | 4/1994 | Madsen | |
| 5,325,660 A | 7/1994 | Taniguchi et al. | |
| 5,332,036 A | 7/1994 | Shirley et al. | |
| 5,336,081 A * | 8/1994 | Saito | F23J 7/00 |
| | | | 110/342 |
| 5,344,307 A | 9/1994 | Schwartz et al. | |
| 5,345,756 A | 9/1994 | Jahnke et al. | |
| 5,355,668 A | 10/1994 | Weil et al. | |
| 5,359,847 A | 11/1994 | Pillsbury et al. | |
| 5,361,586 A | 11/1994 | McWhirter et al. | |
| 5,388,395 A | 2/1995 | Scharpf et al. | |
| 5,394,688 A | 3/1995 | Amos | |
| 5,402,847 A | 4/1995 | Wilson et al. | |
| 5,444,971 A | 8/1995 | Holenberger | |
| 5,457,951 A | 10/1995 | Johnson et al. | |
| 5,458,481 A | 10/1995 | Surbey et al. | |
| 5,468,270 A | 11/1995 | Borszynski | |
| 5,490,378 A | 2/1996 | Berger et al. | |
| 5,542,840 A | 8/1996 | Surbey et al. | |
| 5,566,756 A | 10/1996 | Chaback et al. | |
| 5,572,862 A | 11/1996 | Mowill | |
| 5,581,998 A | 12/1996 | Craig | |

(56) References Cited

U.S. PATENT DOCUMENTS

| | | | |
|---|---|---|---|
| 5,584,182 A | 12/1996 | Althaus et al. |
| 5,590,518 A | 1/1997 | Janes |
| 5,623,819 A | 4/1997 | Bowker et al. |
| 5,628,182 A | 5/1997 | Mowill |
| 5,628,184 A * | 5/1997 | Santos | F02C 3/22 60/39.281 |
| 5,634,329 A | 6/1997 | Andersson et al. |
| 5,638,675 A | 6/1997 | Zysman et al. |
| 5,640,840 A | 6/1997 | Briesch |
| 5,647,215 A * | 7/1997 | Sharifi | F23D 17/002 239/431 |
| 5,657,631 A | 8/1997 | Androsov |
| 5,680,764 A | 10/1997 | Viteri |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A | 3/1998 | Golomb et al. |
| 5,725,054 A | 3/1998 | Shayegi et al. |
| 5,740,786 A | 4/1998 | Gartner |
| 5,743,079 A | 4/1998 | Walsh et al. |
| 5,765,363 A | 6/1998 | Mowill |
| 5,771,867 A | 6/1998 | Amstutz et al. |
| 5,771,868 A | 6/1998 | Khair |
| 5,802,854 A | 9/1998 | Maeda et al. |
| 5,819,540 A | 10/1998 | Massarani |
| 5,832,712 A | 11/1998 | Ronning et al. |
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson et al. |
| 5,956,937 A | 9/1999 | Beichel |
| 5,968,349 A | 10/1999 | Duyvesteyn et al. |
| 5,974,780 A | 11/1999 | Santos |
| 5,992,388 A | 11/1999 | Seger |
| 6,016,658 A | 1/2000 | Willis et al. |
| 6,032,465 A | 3/2000 | Regnier |
| 6,035,641 A | 3/2000 | Lokhandwala |
| 6,047,550 A * | 4/2000 | Beebe | F23L 7/00 60/733 |
| 6,062,026 A | 5/2000 | Woollenweber et al. |
| 6,079,974 A | 6/2000 | Thompson |
| 6,082,093 A | 7/2000 | Greenwood et al. |
| 6,089,855 A | 7/2000 | Becker et al. |
| 6,094,916 A | 8/2000 | Puri et al. |
| 6,101,983 A | 8/2000 | Anand et al. |
| 6,148,602 A | 11/2000 | Demetri |
| 6,170,264 B1 | 1/2001 | Viteri et al. |
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Åsen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon, IV |
| 6,263,659 B1 | 7/2001 | Dillon, IV et al. |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Åsen et al. |
| 6,301,888 B1 | 10/2001 | Gray |
| 6,301,889 B1 | 10/2001 | Gladden et al. |
| 6,305,929 B1 | 10/2001 | Chung et al. |
| 6,311,471 B1 * | 11/2001 | Waldherr | F02C 3/30 60/39.55 |
| 6,314,721 B1 | 11/2001 | Mathews et al. |
| 6,324,867 B1 | 12/2001 | Fanning et al. |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen et al. |
| 6,370,870 B1 | 4/2002 | Kamijo et al. |
| 6,374,591 B1 | 4/2002 | Johnson et al. |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,505,683 B2 | 1/2003 | Minkkinen et al. |
| 6,508,209 B1 | 1/2003 | Collier |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,644,041 B1 | 11/2003 | Eyermann |
| 6,655,150 B1 | 12/2003 | Åsen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |
| 6,790,030 B2 | 9/2004 | Fischer et al. |
| 6,805,483 B2 | 10/2004 | Tomlinson et al. |
| 6,810,673 B2 | 11/2004 | Snyder |

(56) References Cited

U.S. PATENT DOCUMENTS

| | | |
|---|---|---|
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol |
| 6,868,676 B1 * | 3/2005 | Haynes ............ F02C 3/14 60/740 |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakka et al. |
| 7,059,152 B2 | 6/2006 | Oakey et al. |
| 7,065,953 B1 | 6/2006 | Kopko |
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |
| 7,137,623 B2 | 11/2006 | Mockry et al. |
| 7,143,572 B2 | 12/2006 | Ooka et al. |
| 7,143,606 B2 | 12/2006 | Tranier |
| 7,146,969 B2 | 12/2006 | Weirich |
| 7,147,461 B2 | 12/2006 | Neary |
| 7,148,261 B2 | 12/2006 | Hershkowitz et al. |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,183,328 B2 | 2/2007 | Hershkowitz et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,217,303 B2 | 5/2007 | Hershkowitz et al. |
| 7,225,623 B2 | 6/2007 | Koshoffer |
| 7,237,385 B2 | 7/2007 | Carrea |
| 7,284,362 B2 | 10/2007 | Marin et al. |
| 7,299,619 B2 | 11/2007 | Briesch et al. |
| 7,299,868 B2 | 11/2007 | Zapadinski |
| 7,302,801 B2 | 12/2007 | Chen |
| 7,305,817 B2 | 12/2007 | Blodgett et al. |
| 7,305,831 B2 | 12/2007 | Carrea et al. |
| 7,313,916 B2 | 1/2008 | Pellizzari |
| 7,318,317 B2 | 1/2008 | Carrea |
| 7,343,742 B2 | 3/2008 | Wimmer et al. |
| 7,353,655 B2 | 4/2008 | Bolis et al. |
| 7,357,857 B2 | 4/2008 | Hart et al. |
| 7,363,756 B2 | 4/2008 | Carrea et al. |
| 7,363,764 B2 | 4/2008 | Griffin et al. |
| 7,381,393 B2 | 6/2008 | Lynn |
| 7,401,577 B2 | 7/2008 | Saucedo et al. |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,468,173 B2 | 12/2008 | Hughes et al. |
| 7,472,550 B2 | 1/2009 | Lear et al. |
| 7,481,048 B2 | 1/2009 | Harmon et al. |
| 7,481,275 B2 | 1/2009 | Olsvik et al. |
| 7,482,500 B2 | 1/2009 | Johann et al. |
| 7,485,761 B2 | 2/2009 | Schindler et al. |
| 7,488,857 B2 | 2/2009 | Johann et al. |
| 7,490,472 B2 | 2/2009 | Lynghjem et al. |
| 7,491,250 B2 | 2/2009 | Hershkowitz et al. |
| 7,492,054 B2 | 2/2009 | Catlin |
| 7,493,769 B2 | 2/2009 | Jangili |
| 7,498,009 B2 | 3/2009 | Leach et al. |
| 7,503,178 B2 | 3/2009 | Bucker et al. |
| 7,503,948 B2 | 3/2009 | Hershkowitz et al. |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. |
| 7,520,134 B2 | 4/2009 | Durbin et al. |
| 7,523,603 B2 | 4/2009 | Hagen et al. |
| 7,536,252 B1 | 5/2009 | Hibshman et al. |
| 7,536,873 B2 | 5/2009 | Nohlen |
| 7,540,150 B2 | 6/2009 | Schmid et al. |
| 7,559,977 B2 | 7/2009 | Fleischer et al. |
| 7,562,519 B1 | 7/2009 | Harris et al. |
| 7,562,529 B2 | 7/2009 | Kuspert et al. |
| 7,566,394 B2 | 7/2009 | Koseoglu |
| 7,574,856 B2 | 8/2009 | Mak |
| 7,591,866 B2 | 9/2009 | Bose |
| 7,594,386 B2 | 9/2009 | Narayanan et al. |
| 7,610,752 B2 | 11/2009 | Betta et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,634,915 B2 | 12/2009 | Hoffmann et al. |
| 7,635,408 B2 | 12/2009 | Mak et al. |
| 7,637,093 B2 | 12/2009 | Rao |
| 7,644,573 B2 | 1/2010 | Smith et al. |
| 7,650,744 B2 | 1/2010 | Varatharajan et al. |
| 7,654,320 B2 | 2/2010 | Payton |
| 7,654,330 B2 | 2/2010 | Zubrin et al. |
| 7,655,071 B2 | 2/2010 | De Vreede |
| 7,670,135 B1 | 3/2010 | Zink et al. |
| 7,673,454 B2 | 3/2010 | Saito et al. |
| 7,673,685 B2 | 3/2010 | Shaw et al. |
| 7,674,443 B1 | 3/2010 | Davis |
| 7,677,309 B2 | 3/2010 | Shaw et al. |
| 7,681,394 B2 | 3/2010 | Haugen |
| 7,682,597 B2 | 3/2010 | Blumenfeld et al. |
| 7,690,204 B2 | 4/2010 | Drnevich et al. |
| 7,691,788 B2 | 4/2010 | Tan et al. |
| 7,695,703 B2 | 4/2010 | Sobolevskiy et al. |
| 7,717,173 B2 | 5/2010 | Grott |
| 7,721,543 B2 | 5/2010 | Massey et al. |
| 7,726,114 B2 | 6/2010 | Evulet |
| 7,734,408 B2 | 6/2010 | Shiraki |
| 7,739,864 B2 | 6/2010 | Finkenrath et al. |
| 7,749,311 B2 | 7/2010 | Saito et al. |

(56) References Cited

U.S. PATENT DOCUMENTS

| | | |
|---|---|---|
| 7,752,848 B2 | 7/2010 | Balan et al. |
| 7,752,850 B2 | 7/2010 | Laster et al. |
| 7,753,039 B2 | 7/2010 | Harima et al. |
| 7,753,972 B2 | 7/2010 | Zubrin et al. |
| 7,762,084 B2 | 7/2010 | Martis et al. |
| 7,763,163 B2 | 7/2010 | Koseoglu |
| 7,763,227 B2 | 7/2010 | Wang |
| 7,765,810 B2 | 8/2010 | Pfefferle |
| 7,788,897 B2 | 9/2010 | Campbell et al. |
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,802,434 B2 | 9/2010 | Varatharajan et al. |
| 7,815,873 B2 | 10/2010 | Sankaranarayanan et al. |
| 7,815,892 B2 | 10/2010 | Hershkowitz et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,846,401 B2 | 12/2010 | Hershkowitz et al. |
| 7,861,511 B2 | 1/2011 | Chillar et al. |
| 7,874,140 B2 | 1/2011 | Fan et al. |
| 7,874,350 B2 | 1/2011 | Pfefferle |
| 7,875,402 B2 | 1/2011 | Hershkowitz et al. |
| 7,882,692 B2 | 2/2011 | Pronske et al. |
| 7,886,522 B2 | 2/2011 | Kammel |
| 7,895,822 B2 | 3/2011 | Hoffmann et al. |
| 7,896,105 B2 | 3/2011 | Dupriest |
| 7,906,304 B2 | 3/2011 | Kohr |
| 7,909,898 B2 | 3/2011 | White et al. |
| 7,914,749 B2 | 3/2011 | Carstens et al. |
| 7,914,764 B2 | 3/2011 | Hershkowitz et al. |
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,955,403 B2 | 6/2011 | Ariyapadi et al. |
| 7,966,822 B2 | 6/2011 | Myers et al. |
| 7,976,803 B2 | 7/2011 | Hooper et al. |
| 7,980,312 B1 | 7/2011 | Hill et al. |
| 7,985,399 B2 | 7/2011 | Drnevich et al. |
| 7,988,750 B2 | 8/2011 | Lee et al. |
| 8,001,789 B2 | 8/2011 | Vega et al. |
| 8,029,273 B2 | 10/2011 | Paschereit et al. |
| 8,036,813 B2 | 10/2011 | Tonetti et al. |
| 8,038,416 B2 | 10/2011 | Ono et al. |
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,371,102 B1* | 2/2013 | Lee .............. F02C 9/28 356/939 |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,567,200 B2 | 10/2013 | Brook et al. |
| 8,616,294 B2 | 12/2013 | Zubrin et al. |
| 8,627,643 B2 | 1/2014 | Chillar et al. |
| 9,957,876 B2* | 5/2018 | Zhang .............. F02M 26/05 |
| 9,964,056 B2* | 5/2018 | Primus .............. F02D 41/0052 |
| 2001/0000049 A1 | 3/2001 | Kataoka et al. |
| 2001/0029732 A1 | 10/2001 | Bachmann |
| 2001/0045090 A1 | 11/2001 | Gray |
| 2001/0049932 A1* | 12/2001 | Beebe .............. F23L 7/00 60/776 |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0187449 A1 | 12/2002 | Doebbeling et al. |
| 2003/0005698 A1 | 1/2003 | Keller |
| 2003/0131582 A1 | 7/2003 | Anderson et al. |
| 2003/0134241 A1 | 7/2003 | Marin et al. |
| 2003/0150216 A1* | 8/2003 | O'Beck .............. F02C 3/30 60/775 |
| 2003/0188533 A1* | 10/2003 | Jaster .............. F02B 37/04 60/608 |
| 2003/0221409 A1 | 12/2003 | McGowan |

(56) References Cited

U.S. PATENT DOCUMENTS

| | | |
|---|---|---|
| 2004/0006994 A1 | 1/2004 | Walsh et al. |
| 2004/0068981 A1 | 4/2004 | Siefker et al. |
| 2004/0166034 A1 | 8/2004 | Kaefer |
| 2004/0170559 A1 | 9/2004 | Hershkowitz et al. |
| 2004/0223408 A1 | 11/2004 | Mathys et al. |
| 2004/0238654 A1 | 12/2004 | Hagen et al. |
| 2005/0028529 A1 | 2/2005 | Bartlett et al. |
| 2005/0114010 A1* | 5/2005 | Healy ................. F02C 9/28 701/100 |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0236602 A1 | 10/2005 | Viteri et al. |
| 2006/0107666 A1* | 5/2006 | Kothnur ............ F02C 7/222 60/773 |
| 2006/0112675 A1 | 6/2006 | Anderson et al. |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0248888 A1 | 11/2006 | Geskes |
| 2007/0000242 A1 | 1/2007 | Harmon et al. |
| 2007/0044475 A1 | 3/2007 | Leser et al. |
| 2007/0044479 A1 | 3/2007 | Brandt et al. |
| 2007/0089419 A1* | 4/2007 | Matsumoto ............ F23R 3/06 60/737 |
| 2007/0089425 A1 | 4/2007 | Motter et al. |
| 2007/0107430 A1 | 5/2007 | Schmid et al. |
| 2007/0144747 A1 | 6/2007 | Steinberg |
| 2007/0231233 A1 | 10/2007 | Bose |
| 2007/0234702 A1 | 10/2007 | Hagen et al. |
| 2007/0245736 A1 | 10/2007 | Barnicki |
| 2007/0249738 A1 | 10/2007 | Haynes et al. |
| 2007/0272201 A1 | 11/2007 | Amano et al. |
| 2008/0000229 A1 | 1/2008 | Kuspert et al. |
| 2008/0006561 A1 | 1/2008 | Moran et al. |
| 2008/0010967 A1 | 1/2008 | Griffin et al. |
| 2008/0034727 A1 | 2/2008 | Sutikno |
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0115478 A1 | 5/2008 | Sullivan |
| 2008/0118310 A1 | 5/2008 | Graham |
| 2008/0127632 A1 | 6/2008 | Finkenrath et al. |
| 2008/0155984 A1 | 7/2008 | Liu et al. |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare et al. |
| 2008/0251234 A1 | 10/2008 | Wilson et al. |
| 2008/0264033 A1* | 10/2008 | Lacy ................. F23R 3/286 60/39.49 |
| 2008/0290719 A1 | 11/2008 | Kaminsky et al. |
| 2008/0309087 A1 | 12/2008 | Evulet et al. |
| 2009/0000762 A1 | 1/2009 | Wilson et al. |
| 2009/0025390 A1 | 1/2009 | Christensen et al. |
| 2009/0038247 A1 | 2/2009 | Taylor et al. |
| 2009/0044539 A1* | 2/2009 | Eroglu ................. F23L 7/00 60/742 |
| 2009/0056342 A1 | 3/2009 | Kirzhner |
| 2009/0064653 A1 | 3/2009 | Hagen et al. |
| 2009/0071159 A1* | 3/2009 | Parker ................. F23R 3/28 60/747 |
| 2009/0071166 A1 | 3/2009 | Hagen et al. |
| 2009/0084082 A1* | 4/2009 | Martin ................. F01D 9/023 60/39.281 |
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0157230 A1 | 6/2009 | Hibshman et al. |
| 2009/0193809 A1 | 8/2009 | Schroder et al. |
| 2009/0205334 A1 | 8/2009 | Aljabari et al. |
| 2009/0218821 A1 | 9/2009 | ElKady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0262599 A1 | 10/2009 | Kohrs et al. |
| 2009/0272116 A1* | 11/2009 | Bland ................. F23C 6/047 60/737 |
| 2009/0284013 A1* | 11/2009 | Anand ............... B01D 53/8625 290/52 |
| 2009/0301054 A1 | 12/2009 | Simpson et al. |
| 2009/0301099 A1 | 12/2009 | Nigro |
| 2010/0003123 A1 | 1/2010 | Smith |
| 2010/0018218 A1 | 1/2010 | Riley et al. |
| 2010/0058732 A1 | 3/2010 | Kaufmann et al. |
| 2010/0115960 A1 | 5/2010 | Brautsch et al. |
| 2010/0126176 A1 | 5/2010 | Kim |
| 2010/0126906 A1 | 5/2010 | Sury |
| 2010/0162703 A1 | 7/2010 | Li et al. |
| 2010/0162710 A1* | 7/2010 | Senior ................. F23R 3/286 60/737 |
| 2010/0170216 A1* | 7/2010 | Venkataraman .......... F02C 7/22 60/39.37 |
| 2010/0170219 A1* | 7/2010 | Venkataraman ........ F02C 7/228 60/39.281 |
| 2010/0170251 A1* | 7/2010 | Davis, Jr. ................. F02C 7/228 60/740 |
| 2010/0170252 A1* | 7/2010 | Venkataraman .......... F02C 3/20 60/742 |
| 2010/0170253 A1 | 7/2010 | Berry et al. |
| 2010/0170254 A1* | 7/2010 | Venkataraman ........ F02C 7/228 60/746 |
| 2010/0174466 A1* | 7/2010 | Davis, Jr. ................. F02C 7/22 701/100 |
| 2010/0180565 A1 | 7/2010 | Draper |
| 2010/0229561 A1* | 9/2010 | Bland ................. F23R 3/346 60/747 |
| 2010/0256888 A1* | 10/2010 | Tong ................. F02C 7/232 701/100 |
| 2010/0300102 A1 | 12/2010 | Bathina et al. |
| 2010/0300109 A1* | 12/2010 | Carroni ................. F23L 7/00 60/776 |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0005189 A1* | 1/2011 | Uhm ................. F23D 14/82 60/39.281 |
| 2011/0016849 A1* | 1/2011 | Runde ................. F02D 41/146 60/276 |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | ELKady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | ELKady et al. |
| 2011/0162353 A1 | 7/2011 | Vanvolsem et al. |
| 2011/0162376 A1* | 7/2011 | Guo ................. C10J 3/506 60/746 |
| 2011/0174053 A1* | 7/2011 | Holt ................. F01D 21/003 73/23.31 |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0265488 A1* | 11/2011 | Lawson ................. F02C 3/20 60/775 |
| 2011/0296839 A1* | 12/2011 | Van Nieuwenhuizen ................. F23R 3/286 60/737 |
| 2011/0300493 A1* | 12/2011 | Mittricker ................. F23C 9/00 431/12 |
| 2012/0023954 A1 | 2/2012 | Wichmann |
| 2012/0023955 A1 | 2/2012 | Draper |

(56) References Cited

U.S. PATENT DOCUMENTS

| | | | |
|---|---|---|---|
| 2012/0023956 A1 | 2/2012 | Popovic | |
| 2012/0023957 A1 | 2/2012 | Draper et al. | |
| 2012/0023958 A1 | 2/2012 | Snook et al. | |
| 2012/0023960 A1 | 2/2012 | Minto | |
| 2012/0023962 A1 | 2/2012 | Wichmann et al. | |
| 2012/0023963 A1 | 2/2012 | Wichmann et al. | |
| 2012/0023966 A1 | 2/2012 | Ouellet et al. | |
| 2012/0031581 A1 | 2/2012 | Chillar et al. | |
| 2012/0032810 A1 | 2/2012 | Chillar et al. | |
| 2012/0085100 A1 | 4/2012 | Hughes et al. | |
| 2012/0085973 A1* | 4/2012 | Jungst | C01B 17/0413 252/372 |
| 2012/0096870 A1 | 4/2012 | Wichmann et al. | |
| 2012/0119512 A1 | 5/2012 | Draper | |
| 2012/0131925 A1 | 5/2012 | Mittricker et al. | |
| 2012/0144837 A1 | 6/2012 | Rasmussen et al. | |
| 2012/0185144 A1 | 7/2012 | Draper | |
| 2012/0192565 A1 | 8/2012 | Tretyakov et al. | |
| 2012/0247105 A1 | 10/2012 | Nelson et al. | |
| 2012/0260660 A1* | 10/2012 | Kraemer | F02C 3/34 60/772 |
| 2013/0067927 A1* | 3/2013 | Kirzhner | F23L 7/00 60/773 |
| 2013/0074504 A1* | 3/2013 | Baruah | F23L 7/00 60/742 |
| 2013/0086916 A1 | 4/2013 | Oelfke et al. | |
| 2013/0086917 A1 | 4/2013 | Slobodyanskiy et al. | |
| 2013/0091853 A1 | 4/2013 | Denton et al. | |
| 2013/0091854 A1 | 4/2013 | Gupta et al. | |
| 2013/0098044 A1* | 4/2013 | Singh | F23R 3/045 60/742 |
| 2013/0104562 A1 | 5/2013 | Oelfke et al. | |
| 2013/0104563 A1 | 5/2013 | Oelfke et al. | |
| 2013/0125554 A1* | 5/2013 | Mittricker | F01K 23/10 60/772 |
| 2013/0125555 A1 | 5/2013 | Mittricker et al. | |
| 2013/0232980 A1 | 9/2013 | Chen et al. | |
| 2013/0269310 A1 | 10/2013 | Wichmann et al. | |
| 2013/0269311 A1 | 10/2013 | Wichmann et al. | |
| 2013/0269355 A1 | 10/2013 | Wichmann et al. | |
| 2013/0269356 A1 | 10/2013 | Butkiewicz et al. | |
| 2013/0269357 A1 | 10/2013 | Wichmann et al. | |
| 2013/0269358 A1 | 10/2013 | Wichmann et al. | |
| 2013/0269360 A1 | 10/2013 | Wichmann et al. | |
| 2013/0269361 A1 | 10/2013 | Wichmann et al. | |
| 2013/0269362 A1 | 10/2013 | Wichmann et al. | |
| 2013/0283807 A1* | 10/2013 | Stoia | F23R 3/346 60/772 |
| 2013/0283808 A1 | 10/2013 | Kolvick | |
| 2013/0327050 A1* | 12/2013 | Slobodyanskiy | F23L 7/00 60/772 |
| 2014/0000271 A1 | 1/2014 | Mittricker et al. | |
| 2014/0000273 A1 | 1/2014 | Mittricker et al. | |
| 2014/0007590 A1 | 1/2014 | Huntington et al. | |
| 2014/0013766 A1 | 1/2014 | Mittricker et al. | |
| 2014/0020398 A1 | 1/2014 | Mittricker et al. | |
| 2014/0060073 A1 | 3/2014 | Slobodyanskiy et al. | |
| 2014/0123620 A1 | 5/2014 | Huntington et al. | |
| 2014/0123624 A1 | 5/2014 | Minto | |
| 2014/0123659 A1 | 5/2014 | Biyani et al. | |
| 2014/0123660 A1 | 5/2014 | Stoia et al. | |
| 2014/0123668 A1 | 5/2014 | Huntington et al. | |
| 2014/0123669 A1 | 5/2014 | Huntington et al. | |
| 2014/0123672 A1 | 5/2014 | Huntington et al. | |
| 2014/0130569 A1* | 5/2014 | Doering | G01N 33/0006 73/1.06 |
| 2014/0150445 A1 | 6/2014 | Huntington et al. | |
| 2014/0157788 A1* | 6/2014 | Bathina | F02C 9/40 60/776 |
| 2014/0182298 A1 | 7/2014 | Krull et al. | |
| 2014/0182299 A1 | 7/2014 | Woodall et al. | |
| 2014/0182301 A1 | 7/2014 | Angelyn et al. | |
| 2014/0182302 A1 | 7/2014 | Angelyn et al. | |
| 2014/0182303 A1 | 7/2014 | Angelyn et al. | |
| 2014/0182304 A1 | 7/2014 | Angelyn et al. | |
| 2014/0182305 A1 | 7/2014 | Angelyn et al. | |
| 2014/0196464 A1 | 7/2014 | Biyani et al. | |
| 2014/0196465 A1 | 7/2014 | Laster et al. | |
| 2014/0216011 A1 | 8/2014 | Muthaiah et al. | |
| 2014/0238034 A1* | 8/2014 | Slobodyanskiy | F23R 3/346 60/772 |
| 2014/0260264 A1* | 9/2014 | Stoia | F02C 6/08 60/734 |
| 2014/0260269 A1* | 9/2014 | Davis, Jr. | F23R 3/28 60/737 |
| 2014/0295367 A1* | 10/2014 | Hanzawa | F23L 7/00 432/49 |
| 2014/0318103 A1* | 10/2014 | Latrofa | F02D 41/029 60/274 |
| 2015/0000292 A1 | 1/2015 | Subramaniyan | |
| 2015/0000293 A1 | 1/2015 | Thatcher et al. | |
| 2015/0000294 A1 | 1/2015 | Minto et al. | |
| 2015/0000299 A1 | 1/2015 | Zuo et al. | |
| 2015/0033748 A1 | 2/2015 | Vaezi | |
| 2015/0033749 A1 | 2/2015 | Slobodyanskiy et al. | |
| 2015/0033751 A1 | 2/2015 | Andrew | |
| 2015/0033757 A1 | 2/2015 | White et al. | |
| 2015/0040574 A1 | 2/2015 | Wichmann et al. | |
| 2015/0059348 A1* | 3/2015 | Toronto | F02C 7/228 60/772 |
| 2015/0059350 A1 | 3/2015 | Kolvick et al. | |
| 2015/0075171 A1 | 3/2015 | Sokolov et al. | |
| 2015/0107255 A1* | 4/2015 | Stewart | F23R 3/346 60/733 |
| 2015/0152791 A1 | 6/2015 | White | |
| 2015/0198089 A1 | 7/2015 | Muthaiah et al. | |
| 2015/0204239 A1 | 7/2015 | Minto et al. | |
| 2015/0214879 A1 | 7/2015 | Huntington et al. | |
| 2015/0226133 A1 | 8/2015 | Minto et al. | |
| 2015/0260407 A1* | 9/2015 | Crothers | F23R 3/346 60/776 |
| 2015/0308293 A1 | 10/2015 | Huntington et al. | |
| 2015/0330252 A1 | 11/2015 | Manchikanti et al. | |
| 2015/0377140 A1 | 12/2015 | Rittenhouse et al. | |
| 2015/0377146 A1 | 12/2015 | Della-Fera et al. | |
| 2015/0377148 A1 | 12/2015 | Minto et al. | |
| 2016/0010493 A1 | 1/2016 | O'Dea et al. | |
| 2016/0010548 A1 | 1/2016 | Valeev et al. | |
| 2016/0115839 A1* | 4/2016 | Abrol | F01N 3/208 60/776 |
| 2016/0169518 A1* | 6/2016 | Davis, Jr. | F23N 1/00 60/765 |
| 2017/0114717 A1* | 4/2017 | Martin | F02C 3/34 |
| 2017/0176013 A1* | 6/2017 | Hughes | F01D 5/185 |
| 2019/0010883 A1* | 1/2019 | Pannuzzo | F02D 41/0235 |

FOREIGN PATENT DOCUMENTS

| | | |
|---|---|---|
| GB | 0776269 | 6/1957 |
| GB | 2117053 | 10/1983 |
| WO | WO1999006674 | 2/1999 |
| WO | WO1999063210 | 12/1999 |
| WO | WO2007068682 | 6/2007 |
| WO | WO2008142009 | 11/2008 |
| WO | WO2011003606 | 1/2011 |
| WO | WO2012003489 | 1/2012 |
| WO | WO2012128928 | 9/2012 |
| WO | WO2012128929 | 9/2012 |
| WO | WO2012170114 | 12/2012 |
| WO | WO2013147632 | 10/2013 |
| WO | WO2013147633 | 10/2013 |
| WO | WO2013155214 | 10/2013 |
| WO | WO2013163045 | 10/2013 |
| WO | WO2014071118 | 5/2014 |
| WO | WO2014071215 | 5/2014 |
| WO | WO2014133406 | 9/2014 |

OTHER PUBLICATIONS

PCT Invitation to Pay Additional Fees; Application No. PCT/US2016/020884; dated May 31, 2016; 7 pages.

(56) References Cited

OTHER PUBLICATIONS

PCT International Search Report and Written Opinion; Application No. PCT/US2016/020884; dated Aug. 10, 2016; 19 pages.
Ahmed, S. et al. (1998) "Catalytic Partial Oxidation Reforming of Hydrocarbon Fuels," 1998 Fuel Cell Seminar, 7 pgs.
Air Products and Chemicals, Inc. (2008) "Air Separation Technology—Ion Transport Membrane (ITM)," www.airproducts.com/ASUsales, 3 pgs.
Air Products and Chemicals, Inc. (2011) "Air Separation Technology Ion Transport Membrane (ITM)," www.airproducts.com/gasification, 4 pgs.
Anderson, R. E. (2006) "Durability and Reliability Demonstration of a Near-Zero-Emission Gas-Fired Power Plant," California Energy Comm., CEC 500-2006-074, 80 pgs.
Baxter, E. et al. (2003) "Fabricate and Test an Advanced Non-Polluting Turbine Drive Gas Generator," U. S. Dept. of Energy, Nat'l Energy Tech. Lab., DE-FC26-00NT 40804, 51 pgs.
Bolland, O. et al. (1998) "Removal of CO2 From Gas Turbine Power Plants Evaluation of Pre-and Postcombustion Methods," SINTEF Group, www.energy.sintef.no/publ/xergi/98/3/art-8engelsk.htm, 11 pgs.
BP Press Release (2006) "BP and Edison Mission Group Plan Major Hydrogen Power Project for California," www.bp.com/hydrogenpower, 2 pgs.
Bryngelsson, M. et al. (2005) "Feasibility Study of $CO_2$ Removal From Pressurized Flue Gas in a Fully Fired Combined Cycle—The Sargas Project," KTH—Royal Institute of Technology, Dept. of Chemical Engineering and Technology, 9 pgs.
Clark, Hal (2002) "Development of a Unique Gas Generator for a Non-Polluting Power Plant," California Energy Commission Feasibility Analysis, P500-02-011F, 42 pgs.
Foy, Kirsten et al. (2005) "Comparison of Ion Transport Membranes" Fourth Annual Conference on Carbon Capture and Sequestration, DOE/NETL; 11 pgs.
Cho, J. H. et al. (2005) "Marrying LNG and Power Generation," Energy Markets; 10, 8; ABI/INFORM Trade & Industry, 5 pgs.
Ciulia, Vincent. (2001-2003) "Auto Repair. How the Engine Works," http://autorepair.about.com/cs/generalinfo/a/aa060500a.htm, 1 page.
Corti, A. et al. (1988) "Athabasca Mineable Oil Sands: The RTR/Gulf Extraction Process Theoretical Model of Bitumen Detachment," $4^{th}$ UNITAR/UNDP Int'l Conf. on Heavy Crude and Tar Sands Proceedings, v.5, paper No. 81, Edmonton, AB, Canada, 4 pgs.
Science Clarified (2012) "Cryogenics," http://www.scienceclarified.com/Co-Di/Cryogenics.html; 6 pgs.
Defrate, L. A. et al. (1959) "Optimum Design of Ejector Using Digital Computers" Chem. Eng. Prog. Symp. Ser., 55 ( 21), 12 pgs.
Ditaranto, M. et al. (2006) "Combustion Instabilities in Sudden Expansion Oxy-Fuel Flames," ScienceDirect, Combustion and Flame, v.146, 20 pgs.
Elwell, L. C. et al. (2005) "Technical Overview of Carbon Dioxide Capture Technologies for Coal-Fired Power Plants," MPR Associates, Inc., www.mpr.com/uploads/news/co2-capture-coal-fired.pdf, 15 pgs.
Eriksson, Sara. (2005) "Development of Methane Oxidation Catalysts for Different Gas Turbine Combustor Concepts." KTH'The Royal Institute of Technology, Department of Chemical Engineering and Technology, Chemical Technology, Licentiate Thesis, Stockholm Sweden; 45 pgs.
Ertesvag, I. S. et al. (2005) "Exergy Analysis of a Gas-Turbine Combined-Cycle Power Plant With Precombustion $CO_2$ Capture," Elsevier, 35 pgs.
Elkady, Ahmed. M. et al. (2009) "Application of Exhaust Gas Recirculation in a DLN F-Class Combustion System for Postcombustion Carbon Capture," ASME J. Engineering for Gas Turbines and Power, vol. 131, 6 pgs.
Evulet, Andrei T. et al. (2009) "On the Performance and Operability of GE's Dry Low $NO_x$ Combustors utilizing Exhaust Gas Recirculation for Post-Combustion Carbon Capture" Energy Procedia I, 8 pgs.
Caldwell Energy Company (2011) "Wet Compression"; IGTI 2011—CTIC Wet Compression, http://www.turbineinletcooling.org/resources/papers/CTIC_WetCompression_Shepherd_ASMETurboExpo2011.pdf , 22 pgs.
Luby, P. et al. (2003) "Zero Carbon Power Generation: IGCC as the Premium Option," Powergen International, 19 pgs.
Macadam, S. et al. (2007) "Coal-Based Oxy-Fuel System Evaluation and Combustor Development," Clean Energy Systems, Inc.; presented at the $2^{nd}$ International Freiberg Conference on IGCC & XtL Technologies, 6 pgs.
Morehead, H. (2007) "Siemens Global Gasification and IGCC Update," Siemens, Coal-Gen, 17 pgs.
Nanda, R. et al. (2007) "Utilizing Air Based Technologies as Heat Source for LNG Vaporization," presented at the $86^{th}$ Annual convention of the Gas Processors of America (GPA 2007), , San Antonio, TX; 13 pgs.
Reeves, S. R. (2001) "Geological Sequestration of $CO_2$ in Deep, Unmineable Coalbeds: An Integrated Research and Commercial-Scale Field Demonstration Project," SPE 71749; presented at the 2001 SPE Annual Technical Conference and Exhibition, New Orleans, Louisiana, 10 pgs.
Reeves, S. R. (2003) "Enhanced Coalbed Methane Recovery," Society of Petroleum Engineers 101466-DL; SPE Distinguished Lecture Series, 8 pgs.
Richards, Geo A., et al. (2001) "Advanced Steam Generators," National Energy Technology Lab., Pittsburgh, PA, and Morgantown, WV; NASA Glenn Research Center (US), 7 pgs.
Rosetta, M. J. et al. (2006) "Integrating Ambient Air Vaporization Technology with Waste Heat Recovery—A Fresh Approach to LNG Vaporization," presented at the $85^{th}$ annual convention of the Gas Processors of America (GPA 2006), Grapevine, Texas, 22 pgs.
Snarheim, D. et al. (2006) "Control Design for a Gas Turbine Cycle With $CO_2$ Capture Capabilities," Modeling, Identification and Control, vol. 00; presented at the $16^{th}$ IFAC World Congress, Prague, Czech Republic, 10 pgs.
Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," Department of Energy and Process Eng., Norwegian Univ. of Science and Technology, 9 pgs.
Van Hemert, P. et al. (2006) "Adsorption of Carbon Dioxide and a Hydrogen-Carbon Dioxide Mixture," Intn'l Coalbed Methane Symposium (Tuscaloosa, AL) Paper 0615, 9 pgs.
Zhu, J. et al. (2002) "Recovery of Coalbed Methane by Gas Injection," Society of Petroleum Engineers 75255; presented at the 2002 SPE Annual Technical Conference and Exhibition, Tulsa, Oklahoma, 15 pgs.

* cited by examiner

FUEL STAGING IN A GAS TURBINE ENGINE

CROSS-REFERENCE TO RELATED APPLICATIONS

This application claims priority to and benefit of U.S. Provisional Patent Application No. 62/129,708, entitled "FUEL STAGING IN A GAS TURBINE ENGINE," filed on Mar. 6, 2015, which is hereby incorporated by reference in its entirety for all purposes.

BACKGROUND

The subject matter disclosed herein relates to gas turbine engines, and more specifically, to combustors of gas turbine engines.

Gas turbine engines are used in a wide variety of applications, such as power generation, aircraft, and various machinery. Gas turbine engines generally combust a fuel with an oxidant (e.g., air) in a combustor section to generate hot combustion gases, which then drive one or more turbine stages of a turbine section. In turn, the turbine section drives one or more compressor stages of a compressor section, thereby compressing oxidant for intake into the combustor section along with the fuel. Again, the fuel and oxidant mix in the combustor section, and then combust to produce the hot combustion gases. In some situations, operation of the gas turbine engine may produce various types and forms of by-products. Accordingly, it may be beneficial to provide systems and methods for controlling the production of the by-products and for controlling the removal of the by-products.

BRIEF DESCRIPTION

Certain embodiments commensurate in scope with the present disclosure are summarized below. These embodiments are not intended to limit the scope of the claims, but rather these embodiments are intended only to provide a brief summary of possible forms of the present disclosure. Indeed, embodiments of the present disclosure may encompass a variety of forms that may be similar to or different from the embodiments set forth below.

In a first embodiment, a gas turbine system includes a turbine combustor. The turbine combustor includes one or more first fuel injectors coupled to a head end of the turbine combustor and configured to deliver a first portion of a fuel to a first axial position of a combustion section of the turbine combustor. The turbine combustor also includes one or more second fuel injectors coupled to the turbine combustor axially downstream of the head end. The one or more second fuel injectors are configured to deliver a second portion of the fuel to a second axial position of the combustion section of the turbine combustor, the second axial position being downstream of the first axial position. The gas turbine system also includes an oxidant supply system configured to provide an oxidant to a head end of the combustion section of the turbine combustor. The gas turbine system also includes a fuel supply system configured to supply the fuel to the one or more first and second fuel injectors. The gas turbine system also includes a controller configured to cause the one or more first fuel injectors to deliver the first portion of the fuel such that combustion of the fuel and oxidant at the first axial position is oxidant-rich, and to cause the one or more second fuel injectors to deliver the second portion of the fuel such that combustion of the fuel and oxidant within the overall combustion section of the turbine combustor is at a defined equivalence ratio.

In a second embodiment, a method includes supplying a first portion of a fuel to a first axial position of a combustion section of a turbine combustor via one or more first fuel injectors coupled to a head end of the turbine combustor. The method also includes measuring a parameter of soot and/or ammonium in an exhaust gas from the turbine combustor using one or more sensors disposed along a flow path of the exhaust gas. The method also includes supplying a second portion of the fuel to a second axial position of the combustion section of the turbine combustor via one or more second fuel injectors coupled to the turbine combustor and positioned axially downstream of the head end and the first axial position. The second portion is determined by a controller based on the measured parameter of the soot and/or ammonium.

In a third embodiment, a system includes a controller. The controller includes one or more tangible, non-transitory, machine-readable media collectively storing one or more sets of instructions. The controller also includes one or more processing devices configured to execute the one or more sets of instructions to supply a first portion of a fuel to a first axial position of a combustion section of a turbine combustor via one or more first fuel injectors coupled to a head end of the turbine combustor; obtain a parameter of soot and/or ammonium in an exhaust gas from the turbine combustor; and supply a second portion of the fuel to a second axial position of the combustion section of the turbine combustor via one or more second fuel injectors coupled to the turbine combustor axially downstream of the head end based on the measured parameter of the soot and/or ammonium. The second axial position is downstream of the first axial position.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
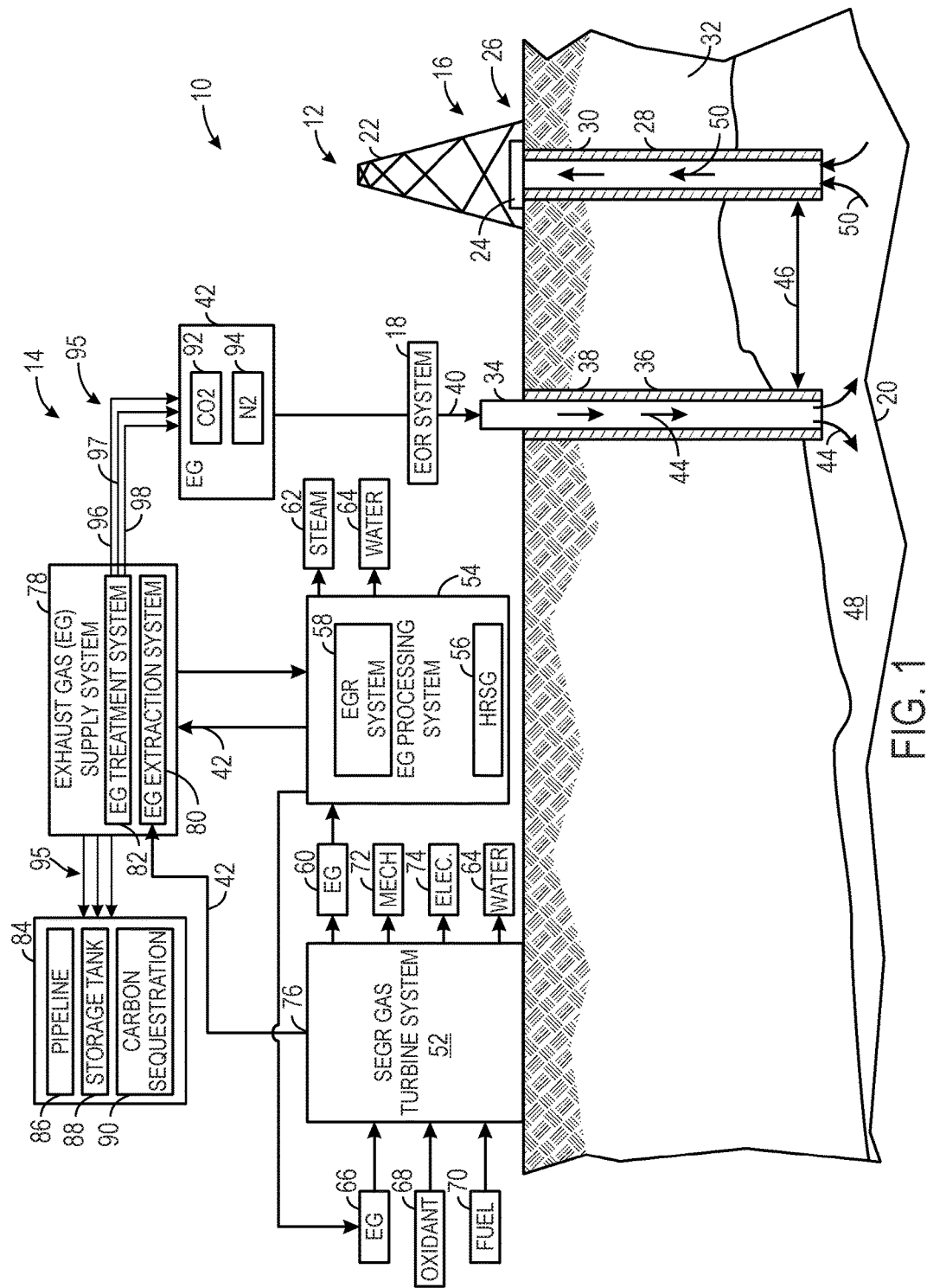
FIG. 1 is a diagram of an embodiment of a system having a turbine-based service system coupled to a hydrocarbon production system.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Accordingly, while example embodiments are capable of various modifications and alternative forms, embodiments thereof are illustrated by way of example in the figures and will herein be described in detail. It should be understood, however, that there is no intent to limit example embodiments to the particular forms disclosed, but to the contrary, example embodiments are to cover all modifications, equivalents, and alternatives falling within the scope of the present invention.

The terminology used herein is for describing particular embodiments only and is not intended to be limiting of example embodiments. As used herein, the singular forms "a", "an" and "the" are intended to include the plural forms as well, unless the context clearly indicates otherwise. The terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Although the terms first, second, primary, secondary, etc. may be used herein to describe various elements, these elements should not be limited by these terms. These terms are only used to distinguish one element from another. For example, but not limiting to, a first element could be termed a second element, and, similarly, a second element could be termed a first element, without departing from the scope of example embodiments. As used herein, the term "and/or" includes any, and all, combinations of one or more of the associated listed items.

Certain terminology may be used herein for the convenience of the reader only and is not to be taken as a limitation on the scope of the invention. For example, words such as "upper", "lower", "left", "right", "front", "rear", "top", "bottom", "horizontal", "vertical", "upstream", "downstream", "fore", "aft", and the like; merely describe the configuration shown in the figures. Indeed, the element or elements of an embodiment of the present invention may be oriented in any direction and the terminology, therefore, should be understood as encompassing such variations unless specified otherwise.

As discussed in detail below, the disclosed embodiments relate generally to gas turbine systems with exhaust gas recirculation (EGR), and particularly to stoichiometric combustion within the gas turbine systems using EGR. For example, the gas turbine systems may be configured to recirculate exhaust gas along an exhaust recirculation path, stoichiometrically combust fuel and oxidant in the presence of the recirculated exhaust gas, and capture some of the recirculated exhaust gas for use in various target systems.

As set forth above, products generated from combustion within gas turbine systems may include nitrogen oxides and sulfur oxides, products of incomplete combustion such as soot, and similar compounds. In stoichiometric combustion systems, such as those used in accordance with certain disclosed embodiments, it is now recognized that soot generation may be of particular concern due to the manner in which fuel and oxidant are provided to the combustors.

To elaborate, while stoichiometric combustion, from a theoretical standpoint, generally involves consuming substantially all of the fuel and oxidant in the combustion reaction such that the products of combustion are substantially or entirely free of unburned fuel and oxidant, in practice this may not necessarily be the case. For example, one measure of stoichiometric combustion is the equivalence ratio, or phi ($\Phi$), which is the ratio of the actual fuel/oxidant ratio relative to the stoichiometric fuel/oxidant ratio. An equivalence ratio of greater than 1.0 results in a fuel-rich combustion of the fuel and oxidant, whereas an equivalence ratio of less than 1.0 results in a fuel-lean combustion of the fuel and oxidant. In contrast, an equivalence ratio of 1.0 results in combustion that is neither fuel-rich nor fuel-lean, thereby substantially consuming all of the fuel and oxidant in the combustion reaction. However, even when a combustor of the gas turbine system operates in the stoichiometric combustion mode of operation, the combustor may have regions of a relatively high equivalence ratio (e.g., greater than 2.0), such as near fuel injectors at the head end of the combustor. Indeed, it is presently recognized that this may result in high levels of soot and/or ammonium emissions of the gas turbine system.

In a general sense, the present disclosure addresses these and other shortcomings of typical systems by providing staged fuel introduction into combustors of a gas turbine engine, which enables a reduction in by-product formation by reducing the occurrence of pockets of fuel-rich combustion within such combustors. However, it should be noted that the present disclosure is not intended to be limited to solving these problems and these technical effects. Rather, the presently disclosed embodiments may have a number of technical effects and may solve a number of different problems.

In one aspect, and by way of non-limiting example, the present disclosure provides systems and methods for reducing the soot and/or ammonium emissions of the gas turbine system using fuel staging. In one example embodiment, one or more first fuel injectors may be coupled to a head end of the combustor, and one or more second fuel injectors may be coupled to the combustor axially downstream of the head end. A fuel supply system is coupled to the combustor and configured to supply a fuel to the one or more first and second fuel injectors. More specifically, the fuel supply system may supply a first portion of the fuel to the one or more first fuel injectors and supply a second portion of the fuel to the one or more second fuel injectors. The first portion of the fuel may be such that fuel-lean combustion occurs in a region of the combustor proximate the head end so as to leave excess oxidant. In such a configuration, the amount of soot produced within the combustor may be greatly reduced due to the presence of more oxidant than is required for complete combustion of the first portion of the fuel. The excess oxidant may be mixed with the second portion of the fuel downstream of the head end so as to utilize substantially all remaining oxidant for combustion. In one particular embodiment, the first and second amounts of fuel may be chosen so as to produce an overall combustion equivalence ratio within the combustor of between 0.95 and 1.05.

Thus, in accordance with the present disclosure, the one or more first fuel injectors are configured to deliver the first portion of the fuel to a first axial position of a combustion section of the combustor. The one or more second fuel injectors are configured to deliver the second portion of the fuel to a second axial position, downstream of the first axial position, of the combustion section of the combustor. As such, the axial fuel staging, in accordance with the present disclosure, allows offloading a portion of the fuel from the head end to downstream positions of the combustor, thereby operating the head end at fuel-leaner conditions. Operation of the combustor (e.g., the head end) at lower equivalence ratio may result in lower levels of soot and/or ammonium emissions of the gas turbine system.

In some embodiments, the combustor of the gas turbine engine may be an ultra low emission technology (ULET) combustor. The ULET combustor may include one or more dilution ports (or inlets) disposed downstream of the head end of the combustor and configured to deliver a dilution gas (e.g., recirculated exhaust gas) to the combustor. In one implementation, the pre-existing one or more dilution ports may be used for the fuel staging. For example, the one or more second fuel injectors may be coupled directly to at least one of the dilution ports and configured to deliver the second portion of the fuel to the combustor. However, in other embodiments, separate fuel injectors may be used.

To help illustrate various aspects of the present disclosure, FIGS. 1-4 provide an overview of an example system incorporating one or more gas turbine systems with the fuel staging described herein. Accordingly, the system 10 described below is one in which various aspects of the present disclosure may be implemented, and it should be appreciated that the subtle interplay of the various inputs, outputs, control mechanisms, and so forth, relating to the system and, particularly, the gas turbine engine, may impact the manner in which aspects of the present disclosure are implemented.

FIG. 1 is a diagram of an embodiment of a system 10 having a hydrocarbon production system 12 associated with a turbine-based service system 14. As discussed in further detail below, various embodiments of the turbine-based service system 14 are configured to provide various services, such as electrical power, mechanical power, and fluids (e.g., exhaust gas), to the hydrocarbon production system 12 to facilitate the production or retrieval of oil and/or gas. In the illustrated embodiment, the hydrocarbon production system 12 includes an oil/gas extraction system 16 and an enhanced oil recovery (EOR) system 18, which are coupled to a subterranean reservoir 20 (e.g., an oil, gas, or hydrocarbon reservoir). The oil/gas extraction system 16 includes a variety of surface equipment 22, such as a Christmas tree or production tree 24, coupled to an oil/gas well 26. Furthermore, the well 26 may include one or more tubulars 28 extending through a drilled bore 30 in the earth 32 to the subterranean reservoir 20. The tree 24 includes one or more valves, chokes, isolation sleeves, blowout preventers, and various flow control devices, which regulate pressures and control flows to and from the subterranean reservoir 20. While the tree 24 is generally used to control the flow of the production fluid (e.g., oil or gas) out of the subterranean reservoir 20, the EOR system 18 may increase the production of oil or gas by injecting one or more fluids into the subterranean reservoir 20.

Accordingly, the EOR system 18 may include a fluid injection system 34, which has one or more tubulars 36 extending through a bore 38 in the earth 32 to the subterranean reservoir 20. For example, the EOR system 18 may route one or more fluids 40, such as gas, steam, water, chemicals, or any combination thereof, into the fluid injection system 34. For example, as discussed in further detail below, the EOR system 18 may be coupled to the turbine-based service system 14, such that the system 14 routes an exhaust gas 42 (e.g., substantially or entirely free of oxygen) to the EOR system 18 for use as the injection fluid 40. The fluid injection system 34 routes the fluid 40 (e.g., the exhaust gas 42) through the one or more tubulars 36 into the subterranean reservoir 20, as indicated by arrows 44. The injection fluid 40 enters the subterranean reservoir 20 through the tubular 36 at an offset distance 46 away from the tubular 28 of the oil/gas well 26. Accordingly, the injection fluid 40 displaces the oil/gas 48 disposed in the subterranean reservoir 20, and drives the oil/gas 48 up through the one or more tubulars 28 of the hydrocarbon production system 12, as indicated by arrows 50. As discussed in further detail below, the injection fluid 40 may include the exhaust gas 42 originating from the turbine-based service system 14, which is able to generate the exhaust gas 42 on-site as needed by the hydrocarbon production system 12. In other words, the turbine-based system 14 may simultaneously generate one or more services (e.g., electrical power, mechanical power, steam, water (e.g., desalinated water), and exhaust gas (e.g., substantially free of oxygen)) for use by the hydrocarbon production system 12, thereby reducing or eliminating the reliance on external sources of such services.

In the illustrated embodiment, the turbine-based service system 14 includes a stoichiometric exhaust gas recirculation (SEGR) gas turbine system 52 and an exhaust gas (EG) processing system 54. The gas turbine system 52 may be configured to operate in a stoichiometric combustion mode of operation (e.g., a stoichiometric control mode) and a non-stoichiometric combustion mode of operation (e.g., a non-stoichiometric control mode), such as a fuel-lean control mode or a fuel-rich control mode. In the stoichiometric control mode, the combustion generally occurs in a substantially stoichiometric ratio of a fuel and oxidant, thereby resulting in substantially stoichiometric combustion. In particular, stoichiometric combustion generally involves consuming substantially all of the fuel and oxidant in the combustion reaction, such that the products of combustion are substantially or entirely free of unburned fuel and oxidant. One measure of stoichiometric combustion is the equivalence ratio, or phi ($\Phi$), which is the ratio of the actual fuel/oxidant ratio relative to the stoichiometric fuel/oxidant ratio. An equivalence ratio of greater than 1.0 results in a fuel-rich combustion of the fuel and oxidant, whereas an equivalence ratio of less than 1.0 results in a fuel-lean combustion of the fuel and oxidant. In contrast, an equivalence ratio of 1.0 results in combustion that is neither fuel-rich nor fuel-lean, thereby substantially consuming all of the fuel and oxidant in the combustion reaction. In context of the disclosed embodiments, the term stoichiometric or substantially stoichiometric may refer to an equivalence ratio of approximately 0.95 to approximately 1.05. However, the disclosed embodiments may also include an equivalence ratio of 1.0 plus or minus 0.01, 0.02, 0.03, 0.04, 0.05, or more. Again, the stoichiometric combustion of fuel and oxidant in the turbine-based service system 14 may result in products of combustion or exhaust gas (e.g., 42) with substantially no unburned fuel or oxidant remaining. For example, the exhaust gas 42 may have less than 1, 2, 3, 4, or 5 percent by volume of oxidant (e.g., oxygen), unburned fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, the exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburned fuel or hydrocarbons (e.g., HCs), nitrogen oxides (e.g., $NO_X$), carbon monoxide (CO), sulfur oxides (e.g., $SO_X$), hydrogen, and other products of incomplete combustion. However, the disclosed embodiments also may produce other ranges of residual fuel, oxidant, and other emissions levels in the exhaust gas 42. As used herein, the terms emissions, emissions levels, and emissions targets may refer to concentration levels of certain products of combustion (e.g., $NO_X$, CO, $SO_X$, $O_2$, $N_2$, $H_2$, HCs, etc.), which may be present in recirculated gas streams, vented gas streams (e.g., exhausted into the atmosphere), and gas streams used in various target systems (e.g., the hydrocarbon production system 12).

Although the SEGR gas turbine system 52 and the EG processing system 54 may include a variety of components in different embodiments, the illustrated EG processing system 54 includes a heat recovery steam generator (HRSG) 56 and an exhaust gas recirculation (EGR) system 58, which receive and process an exhaust gas 60 originating from the SEGR gas turbine system 52. The HRSG 56 may include one or more heat exchangers, condensers, and various heat recovery equipment, which collectively function to transfer heat from the exhaust gas 60 to a stream of water, thereby generating steam 62. The steam 62 may be used in one or more steam turbines, the EOR system 18, or any other portion of the hydrocarbon production system 12. For example, the HRSG 56 may generate low pressure, medium pressure, and/or high pressure steam 62, which may be selectively applied to low, medium, and high pressure steam turbine stages, or different applications of the EOR system 18. In addition to the steam 62, a treated water 64, such as a desalinated water, may be generated by the HRSG 56, the EGR system 58, and/or another portion of the EG processing system 54 or the SEGR gas turbine system 52. The treated water 64 (e.g., desalinated water) may be particularly useful in areas with water shortages, such as inland or desert regions. The treated water 64 may be generated, at least in part, due to the large volume of air driving combustion of fuel within the SEGR gas turbine system 52. While the on-site generation of steam 62 and water 64 may be beneficial in many applications (including the hydrocarbon production system 12), the on-site generation of exhaust gas 42, 60 may be particularly beneficial for the EOR system 18, due to its low oxygen content, high pressure, and heat derived from the SEGR gas turbine system 52. Accordingly, the HRSG 56, the EGR system 58, and/or another portion of the EG processing system 54 may output or recirculate an exhaust gas 66 into the SEGR gas turbine system 52, while also routing the exhaust gas 42 to the EOR system 18 for use with the hydrocarbon production system 12. Likewise, the exhaust gas 42 may be extracted directly from the SEGR gas turbine system 52 (i.e., without passing through the EG processing system 54) for use in the EOR system 18 of the hydrocarbon production system 12.

The exhaust gas recirculation is handled by the EGR system 58 of the EG processing system 54. For example, the EGR system 58 includes one or more conduits, valves, blowers, exhaust gas treatment systems (e.g., filters, particulate removal units, gas separation units, gas purification units, heat exchangers, heat recovery units, moisture removal units, catalyst units, chemical injection units, or any combination thereof), and controls to recirculate the exhaust gas along an exhaust gas circulation path from an output (e.g., discharged exhaust gas 60) to an input (e.g., intake exhaust gas 66) of the SEGR gas turbine system 52. In the illustrated embodiment, the SEGR gas turbine system 52 intakes the exhaust gas 66 into a compressor section having one or more compressors, thereby compressing the exhaust gas 66 for use in a combustor section along with an intake of an oxidant 68 and one or more fuels 70. The oxidant 68 may include ambient air, pure oxygen, oxygen-enriched air, oxygen-reduced air, oxygen-nitrogen mixtures, or any suitable oxidant that facilitates combustion of the fuel 70. The fuel 70 may include one or more gas fuels, liquid fuels, or any combination thereof. For example, the fuel 70 may include natural gas, liquefied natural gas (LNG), syngas, methane, ethane, propane, butane, naphtha, kerosene, diesel fuel, ethanol, methanol, biofuel, or any combination thereof.

The SEGR gas turbine system 52 mixes and combusts the exhaust gas 66, the oxidant 68, and the fuel 70 in the combustor section, thereby generating hot combustion gases or exhaust gas 60 to drive one or more turbine stages in a turbine section. In certain embodiments, each combustor in the combustor section includes one or more premix fuel nozzles, one or more diffusion fuel nozzles, or any combination thereof. For example, each premix fuel nozzle may be configured to mix the oxidant 68 and the fuel 70 internally within the fuel nozzle and/or partially upstream of the fuel nozzle, thereby injecting an oxidant-fuel mixture from the fuel nozzle into the combustion zone for a premixed combustion (e.g., a premixed flame). By further example, each diffusion fuel nozzle may be configured to isolate the flows of oxidant 68 and fuel 70 within the fuel nozzle, thereby separately injecting the oxidant 68 and the fuel 70 from the fuel nozzle into the combustion zone for diffusion combustion (e.g., a diffusion flame). In particular, the diffusion combustion provided by the diffusion fuel nozzles delays mixing of the oxidant 68 and the fuel 70 until the point of initial combustion, i.e., the flame region. In embodiments employing the diffusion fuel nozzles, the diffusion flame may provide increased flame stability, because the diffusion flame generally forms at the point of stoichiometry between the separate streams of oxidant 68 and fuel 70 (i.e., as the oxidant 68 and fuel 70 are mixing). In certain embodiments, one or more diluents (e.g., the exhaust gas 60, steam, nitrogen, or another inert gas) may be pre-mixed with the oxidant 68, the fuel 70, or both, in either the diffusion fuel nozzle or the premix fuel nozzle. In addition, one or more diluents (e.g., the exhaust gas 60, steam, nitrogen, or another inert gas) may be injected into the combustor at or downstream from the point of combustion within each combustor. The use of these diluents may help temper the flame (e.g., premix flame or diffusion flame), thereby helping to reduce $NO_X$ emissions, such as nitrogen monoxide (NO) and nitrogen dioxide ($NO_2$). Regardless of the type of flame, the combustion produces hot combustion gases or exhaust gas 60 to drive one or more turbine stages. As each turbine stage is driven by the exhaust gas 60, the SEGR gas turbine system 52 generates a mechanical power 72 and/or an electrical power 74 (e.g., via an electrical generator). The system 52 also outputs the exhaust gas 60, and may further output water 64. Again, the water 64 may be a treated water, such as a desalinated water, which may be useful in a variety of applications on-site or off-site.

Exhaust extraction is also provided by the SEGR gas turbine system 52 using one or more extraction points 76. For example, the illustrated embodiment includes an exhaust gas (EG) supply system 78 having an exhaust gas (EG) extraction system 80 and an exhaust gas (EG) treatment system 82, which receive exhaust gas 42 from the extraction points 76, treat the exhaust gas 42, and then supply or distribute the exhaust gas 42 to various target systems. The target systems may include the EOR system 18 and/or other systems, such as a pipeline 86, a storage tank 88, or a carbon sequestration system 90. The EG extraction system 80 may include one or more conduits, valves, controls, and flow separations, which facilitate isolation of the exhaust gas 42 from the oxidant 68, the fuel 70, and other contaminants, while also controlling the temperature, pressure, and flow rate of the extracted exhaust gas 42. The EG treatment system 82 may include one or more heat exchangers (e.g., heat recovery units such as heat recovery steam generators, condensers, coolers, or heaters), catalyst systems (e.g., oxidation catalyst systems), particulate and/or water removal systems (e.g., gas dehydration units, inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, exhaust gas compressors, any combination thereof. These subsystems of the EG treatment system 82 enable control of the temperature, pressure, flow rate, moisture content (e.g., amount of water removal), particulate content (e.g., amount of particulate removal), and gas composition (e.g., percentage of $CO_2$, $N_2$, etc.).

The extracted exhaust gas 42 is treated by one or more subsystems of the EG treatment system 82, depending on the target system. For example, the EG treatment system 82 may direct all or part of the exhaust gas 42 through a carbon capture system, a gas separation system, a gas purification system, and/or a solvent based treatment system, which is controlled to separate and purify a carbonaceous gas (e.g., carbon dioxide) 92 and/or nitrogen ($N_2$) 94 for use in the various target systems. For example, embodiments of the EG treatment system 82 may perform gas separation and purification to produce a plurality of different streams 95 of exhaust gas 42, such as a first stream 96, a second stream 97, and a third stream 98. The first stream 96 may have a first composition that is rich in carbon dioxide and/or lean in nitrogen (e.g., a $CO_2$ rich, $N_2$ lean stream). The second stream 97 may have a second composition that has intermediate concentration levels of carbon dioxide and/or nitrogen (e.g., intermediate concentration $CO_2$, $N_2$ stream). The third stream 98 may have a third composition that is lean in carbon dioxide and/or rich in nitrogen (e.g., a $CO_2$ lean, $N_2$ rich stream). Each stream 95 (e.g., 96, 97, and 98) may include a gas dehydration unit, a filter, a gas compressor, or any combination thereof, to facilitate delivery of the stream 95 to a target system. In certain embodiments, the $CO_2$ rich, $N_2$ lean stream 96 may have a $CO_2$ purity or concentration level of greater than approximately 70, 75, 80, 85, 90, 95, 96, 97, 98, or 99 percent by volume, and a $N_2$ purity or concentration level of less than approximately 1, 2, 3, 4, 5, 10, 15, 20, 25, or 30 percent by volume. In contrast, the $CO_2$ lean, $N_2$ rich stream 98 may have a $CO_2$ purity or concentration level of less than approximately 1, 2, 3, 4, 5, 10, 15, 20, 25, or 30 percent by volume, and a $N_2$ purity or concentration level of greater than approximately 70, 75, 80, 85, 90, 95, 96, 97, 98, or 99 percent by volume. The intermediate concentration $CO_2$, $N_2$ stream 97 may have a $CO_2$ purity or concentration level and/or a $N_2$ purity or concentration level of between approximately 30 to 70, 35 to 65, 40 to 60, or 45 to 55 percent by volume. Although the foregoing ranges are merely non-limiting examples, the $CO_2$ rich, $N_2$ lean stream 96 and the $CO_2$ lean, $N_2$ rich stream 98 may be particularly well suited for use with the EOR system 18 and the other systems 84. However, any of these rich, lean, or intermediate concentration $CO_2$ streams 95 may be used, alone or in various combinations, with the EOR system 18 and the other systems 84. For example, the EOR system 18 and the other systems 84 (e.g., the pipeline 86, storage tank 88, and the carbon sequestration system 90) each may receive one or more $CO_2$ rich, $N_2$ lean streams 96, one or more $CO_2$ lean, $N_2$ rich streams 98, one or more intermediate concentration $CO_2$, $N_2$ streams 97, and one or more untreated exhaust gas 42 streams (i.e., bypassing the EG treatment system 82).

The EG extraction system 80 extracts the exhaust gas 42 at one or more extraction points 76 along the compressor section, the combustor section, and/or the turbine section, such that the exhaust gas 42 may be used in the EOR system 18 and other systems 84 at suitable temperatures and pressures. The EG extraction system 80 and/or the EG treatment system 82 also may circulate fluid flows (e.g., exhaust gas 42) to and from the EG processing system 54. For example, a portion of the exhaust gas 42 passing through the EG processing system 54 may be extracted by the EG extraction system 80 for use in the EOR system 18 and the other systems 84. In certain embodiments, the EG supply system 78 and the EG processing system 54 may be independent or integral with one another, and thus may use independent or common subsystems. For example, the EG treatment system 82 may be used by both the EG supply system 78 and the EG processing system 54. Exhaust gas 42 extracted from the EG processing system 54 may undergo multiple stages of gas treatment, such as one or more stages of gas treatment in the EG processing system 54 followed by one or more additional stages of gas treatment in the EG treatment system 82.

At each extraction point 76, the extracted exhaust gas 42 may be substantially free of oxidant 68 and fuel 70 (e.g., unburned fuel or hydrocarbons) due to substantially stoichiometric combustion and/or gas treatment in the EG processing system 54. Furthermore, depending on the target system, the extracted exhaust gas 42 may undergo further treatment in the EG treatment system 82 of the EG supply system 78, thereby further reducing any residual oxidant 68, fuel 70, or other undesirable products of combustion. For example, either before or after treatment in the EG treatment system 82, the extracted exhaust gas 42 may have less than 1, 2, 3, 4, or 5 percent by volume of oxidant (e.g., oxygen), unburned fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, either before or after treatment in the EG treatment system 82, the extracted exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburned fuel or hydrocarbons (e.g., HCs), nitrogen oxides (e.g., $NO_X$), carbon monoxide (CO), sulfur oxides (e.g., $SO_X$), hydrogen, and other products of incomplete combustion. Thus, the exhaust gas 42 is particularly well suited for use with the EOR system 18.

The EGR operation of the turbine system 52 specifically enables the exhaust extraction at a multitude of locations 76. For example, the compressor section of the system 52 may be used to compress the exhaust gas 66 without any oxidant 68 (i.e., only compression of the exhaust gas 66), such that a substantially oxygen-free exhaust gas 42 may be extracted from the compressor section and/or the combustor section prior to entry of the oxidant 68 and the fuel 70. The extraction points 76 may be located at interstage ports between adjacent compressor stages, at ports along the compressor discharge casing, at ports along each combustor in the combustor section, or any combination thereof. In certain embodiments, the exhaust gas 66 may not mix with the oxidant 68 and fuel 70 until it reaches the head end portion and/or fuel nozzles of each combustor in the combustor section. Furthermore, one or more flow separators (e.g., walls, dividers, baffles, or the like) may be used to isolate the oxidant 68 and the fuel 70 from the extraction points 76. With these flow separators, the extraction points 76 may be disposed directly along a wall of each combustor in the combustor section.

Once the exhaust gas 66, oxidant 68, and fuel 70 flow through the head end portion (e.g., through fuel nozzles) into the combustion portion (e.g., combustion chamber) of each combustor, the SEGR gas turbine system 52 is controlled to provide a substantially stoichiometric combustion of the exhaust gas 66, oxidant 68, and fuel 70. For example, the system 52 may maintain an equivalence ratio of approximately 0.95 to approximately 1.05. As a result, the products of combustion of the mixture of exhaust gas 66, oxidant 68, and fuel 70 in each combustor is substantially free of oxygen and unburned fuel. Thus, the products of combustion (or exhaust gas) may be extracted from the turbine section of the SEGR gas turbine system 52 for use as the exhaust gas 42 routed to the EOR system 18. Along the turbine section, the extraction points 76 may be located at any turbine stage, such as interstage ports between adjacent turbine stages. Thus, using any of the foregoing extraction points 76, the turbine-based service system 14 may generate, extract, and deliver the exhaust gas 42 to the hydrocarbon production system 12 (e.g., the EOR system 18) for use in the production of oil/gas 48 from the subterranean reservoir 20.

Figure 2:
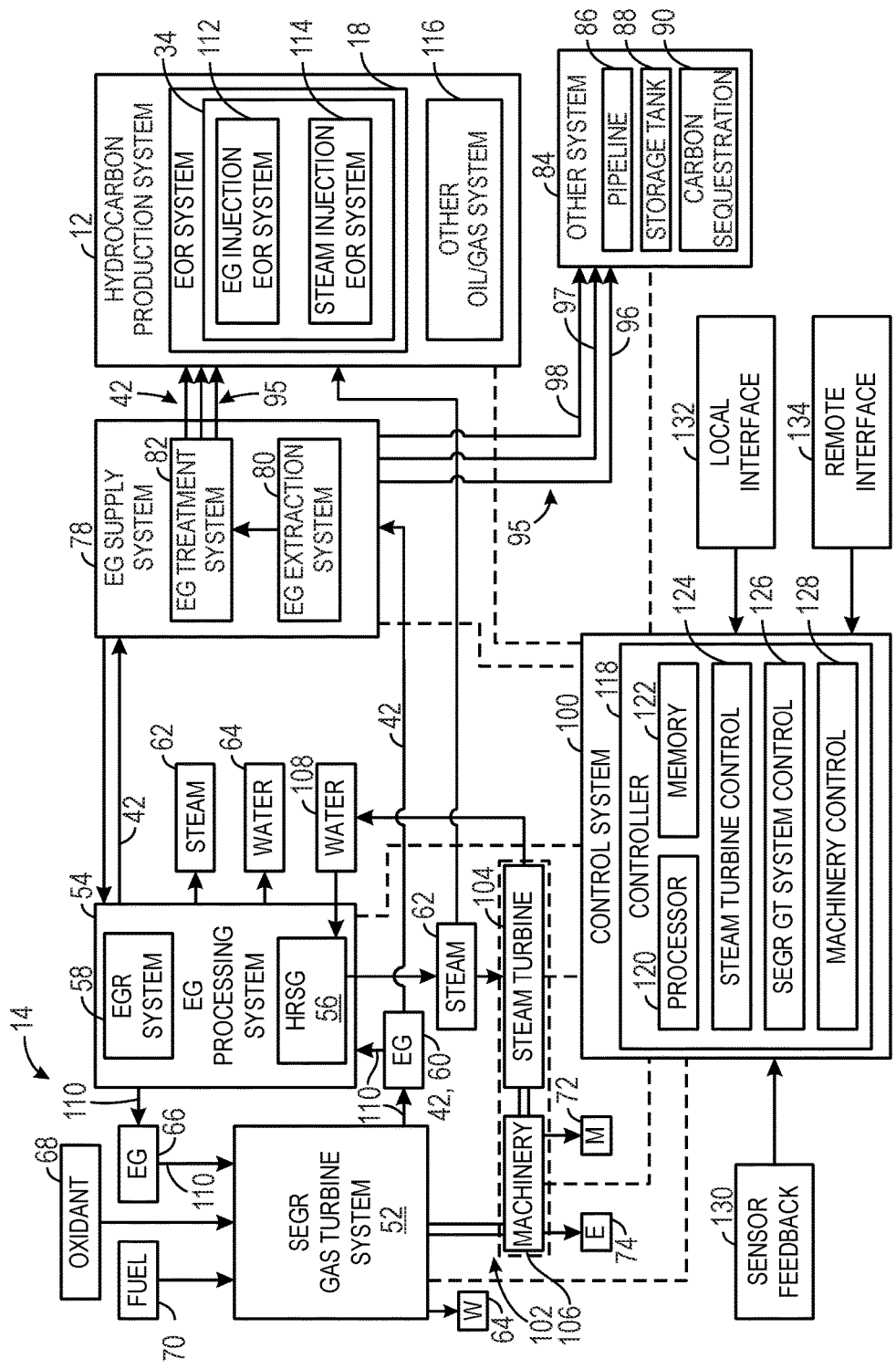
FIG. 2 is a diagram of an embodiment of the system of FIG. 1, further illustrating a control system and a combined cycle system.

FIG. 2 is a diagram of an embodiment of the system 10 of FIG. 1, illustrating a control system 100 coupled to the turbine-based service system 14 and the hydrocarbon production system 12. In the illustrated embodiment, the turbine-based service system 14 includes a combined cycle system 102, which includes the SEGR gas turbine system 52 as a topping cycle, a steam turbine 104 as a bottoming cycle, and the HRSG 56 to recover heat from the exhaust gas 60 to generate the steam 62 for driving the steam turbine 104. Again, the SEGR gas turbine system 52 receives, mixes, and stoichiometrically combusts the exhaust gas 66, the oxidant 68, and the fuel 70 (e.g., premix and/or diffusion flames), thereby producing the exhaust gas 60, the mechanical power 72, the electrical power 74, and/or the water 64. For example, the SEGR gas turbine system 52 may drive one or more loads or machinery 106, such as an electrical generator, an oxidant compressor (e.g., a main air compressor), a gear box, a pump, equipment of the hydrocarbon production system 12, or any combination thereof. In some embodiments, the machinery 106 may include other drives, such as electrical motors or steam turbines (e.g., the steam turbine 104), in tandem with the SEGR gas turbine system 52. Accordingly, an output of the machinery 106 driven by the SEGR gas turbines system 52 (and any additional drives) may include the mechanical power 72 and the electrical power 74. The mechanical power 72 and/or the electrical power 74 may be used on-site for powering the hydrocarbon production system 12, the electrical power 74 may be distributed to the power grid, or any combination thereof. The output of the machinery 106 also may include a compressed fluid, such as a compressed oxidant 68 (e.g., air or oxygen), for intake into the combustion section of the SEGR gas turbine system 52. Each of these outputs (e.g., the exhaust gas 60, the mechanical power 72, the electrical power 74, and/or the water 64) may be considered a service of the turbine-based service system 14.

The SEGR gas turbine system 52 produces the exhaust gas 42, 60, which may be substantially free of oxygen, and routes this exhaust gas 42, 60 to the EG processing system 54 and/or the EG supply system 78. The EG supply system 78 may treat and delivery the exhaust gas 42 (e.g., streams 95) to the hydrocarbon production system 12 and/or the other systems 84. As discussed above, the EG processing system 54 may include the HRSG 56 and the EGR system 58. The HRSG 56 may include one or more heat exchangers, condensers, and various heat recovery equipment, which may be used to recover or transfer heat from the exhaust gas 60 to water 108 to generate the steam 62 for driving the steam turbine 104. Similar to the SEGR gas turbine system 52, the steam turbine 104 may drive one or more loads or machinery 106, thereby generating the mechanical power 72 and the electrical power 74. In the illustrated embodiment, the SEGR gas turbine system 52 and the steam turbine 104 are arranged in tandem to drive the same machinery 106. However, in other embodiments, the SEGR gas turbine system 52 and the steam turbine 104 may separately drive different machinery 106 to independently generate mechanical power 72 and/or electrical power 74. As the steam turbine 104 is driven by the steam 62 from the HRSG 56, the steam 62 gradually decreases in temperature and pressure. Accordingly, the steam turbine 104 recirculates the used steam 62 and/or water 108 back into the HRSG 56 for additional steam generation via heat recovery from the exhaust gas 60. In addition to steam generation, the HRSG 56, the EGR system 58, and/or another portion of the EG processing system 54 may produce the water 64, the exhaust gas 42 for use with the hydrocarbon production system 12, and the exhaust gas 66 for use as an input into the SEGR gas turbine system 52. For example, the water 64 may be a treated water 64, such as a desalinated water for use in other applications. The desalinated water may be particularly useful in regions of low water availability. Regarding the exhaust gas 60, embodiments of the EG processing system 54 may be configured to recirculate the exhaust gas 60 through the EGR system 58 with or without passing the exhaust gas 60 through the HRSG 56.

In the illustrated embodiment, the SEGR gas turbine system 52 has an exhaust recirculation path 110, which extends from an exhaust outlet to an exhaust inlet of the system 52. Along the path 110, the exhaust gas 60 passes through the EG processing system 54, which includes the HRSG 56 and the EGR system 58 in the illustrated embodiment. The EGR system 58 may include one or more conduits, valves, blowers, gas treatment systems (e.g., filters, particulate removal units, gas separation units, gas purification units, heat exchangers, heat recovery units such as heat recovery steam generators, moisture removal units, catalyst units, chemical injection units, or any combination thereof) in series and/or parallel arrangements along the path 110. In other words, the EGR system 58 may include any flow control components, pressure control components, temperature control components, moisture control components, and gas composition control components along the exhaust recirculation path 110 between the exhaust outlet and the exhaust inlet of the system 52. Accordingly, in embodiments with the HRSG 56 along the path 110, the HRSG 56 may be considered a component of the EGR system 58. However, in certain embodiments, the HRSG 56 may be disposed along an exhaust path independent from the exhaust recirculation path 110. Regardless of whether the HRSG 56 is along a separate path or a common path with the EGR system 58, the HRSG 56 and the EGR system 58 intake the exhaust gas 60 and output either the recirculated exhaust gas 66, the exhaust gas 42 for use with the EG supply system 78 (e.g., for the hydrocarbon production system 12 and/or other systems 84), or another output of exhaust gas. Again, the SEGR gas turbine system 52 intakes, mixes, and stoichiometrically combusts the exhaust gas 66, the oxidant 68, and the fuel 70 (e.g., premixed and/or diffusion flames) to produce a substantially oxygen-free and fuel-free exhaust gas 60 for distribution to the EG processing system 54, the hydrocarbon production system 12, or other systems 84.

As noted above with reference to FIG. 1, the hydrocarbon production system 12 may include a variety of equipment to facilitate the recovery or production of oil/gas 48 from a subterranean reservoir 20 through an oil/gas well 26. For example, the hydrocarbon production system 12 may include the EOR system 18 having the fluid injection system 34. In the illustrated embodiment, the fluid injection system 34 includes an exhaust gas injection EOR system 112 and a steam injection EOR system 114. Although the fluid injection system 34 may receive fluids from a variety of sources, the illustrated embodiment may receive the exhaust gas 42 and the steam 62 from the turbine-based service system 14. The exhaust gas 42 and/or the steam 62 produced by the turbine-based service system 14 also may be routed to the hydrocarbon production system 12 for use in other oil/gas systems 116.

The quantity, quality, and flow of the exhaust gas 42 and/or the steam 62 may be controlled by the control system 100. The control system 100 may be dedicated entirely to the turbine-based service system 14, or the control system 100 may optionally also provide control (or at least some data to facilitate control) for the hydrocarbon production system 12 and/or other systems 84. In the illustrated embodiment, the control system 100 includes a controller 118 having a processor 120, a memory 122, a steam turbine control 124, a SEGR gas turbine system control 126, and a machinery control 128. The processor 120 may include a single processor or two or more redundant processors, such as triple redundant processors for control of the turbine-based service system 14. The memory 122 may include volatile and/or non-volatile memory. For example, the memory 122 may include one or more hard drives, flash memory, read-only memory, random access memory, or any combination thereof. The controls 124, 126, and 128 may include software and/or hardware controls. For example, the controls 124, 126, and 128 may include various instructions or code stored on the memory 122 and executable by the processor 120. The control 124 is configured to control operation of the steam turbine 104, the SEGR gas turbine system control 126 is configured to control the system 52, and the machinery control 128 is configured to control the machinery 106. Thus, the controller 118 (e.g., controls 124, 126, and 128) may be configured to coordinate various sub-systems of the turbine-based service system 14 to provide a suitable stream of the exhaust gas 42 to the hydrocarbon production system 12.

In certain embodiments of the control system 100, each element (e.g., system, subsystem, and component) illustrated in the drawings or described herein includes (e.g., directly within, upstream, or downstream of such element) one or more industrial control features, such as sensors and control devices, which are communicatively coupled with one another over an industrial control network along with the controller 118. For example, the control devices associated with each element may include a dedicated device controller (e.g., including a processor, memory, and control instructions), one or more actuators, valves, switches, and industrial control equipment, which enable control based on sensor feedback 130, control signals from the controller 118, control signals from a user, or any combination thereof. Thus, any of the control functionality described herein may be implemented with control instructions stored and/or executable by the controller 118, dedicated device controllers associated with each element, or a combination thereof.

In order to facilitate such control functionality, the control system 100 includes one or more sensors distributed throughout the system 10 to obtain the sensor feedback 130 for use in execution of the various controls, e.g., the controls 124, 126, and 128. For example, the sensor feedback 130 may be obtained from sensors distributed throughout the SEGR gas turbine system 52, the machinery 106, the EG processing system 54, the steam turbine 104, the hydrocarbon production system 12, or any other components throughout the turbine-based service system 14 or the hydrocarbon production system 12. For example, the sensor feedback 130 may include temperature feedback, pressure feedback, flow rate feedback, flame temperature feedback, combustion dynamics feedback, intake oxidant composition feedback, intake fuel composition feedback, exhaust composition feedback, the output level of mechanical power 72, the output level of electrical power 74, the output quantity of the exhaust gas 42, 60, the output quantity or quality of the water 64, or any combination thereof. For example, the sensor feedback 130 may include a composition of the exhaust gas 42, 60 to facilitate stoichiometric combustion in the SEGR gas turbine system 52. For example, the sensor feedback 130 may include feedback from one or more intake oxidant sensors along an oxidant supply path of the oxidant 68, one or more intake fuel sensors along a fuel supply path of the fuel 70, and one or more exhaust emissions sensors disposed along the exhaust recirculation path 110 and/or within the SEGR gas turbine system 52. The intake oxidant sensors, intake fuel sensors, and exhaust emissions sensors may include temperature sensors, pressure sensors, flow rate sensors, and composition sensors. The emissions sensors may includes sensors for nitrogen oxides (e.g., $NO_X$ sensors), carbon oxides (e.g., CO sensors and $CO_2$ sensors), sulfur oxides (e.g., $SO_X$ sensors), hydrogen (e.g., $H_2$ sensors), oxygen (e.g., $O_2$ sensors), unburned hydrocarbons (e.g., HC sensors), or other products of incomplete combustion, or any combination thereof.

Using this feedback 130, the control system 100 may adjust (e.g., increase, decrease, or maintain) the intake flow of exhaust gas 66, oxidant 68, and/or fuel 70 into the SEGR gas turbine system 52 (among other operational parameters) to maintain the equivalence ratio within a suitable range, e.g., between approximately 0.95 to approximately 1.05, between approximately 0.95 to approximately 1.0, between approximately 1.0 to approximately 1.05, or substantially at 1.0. For example, the control system 100 may analyze the feedback 130 to monitor the exhaust emissions (e.g., concentration levels of nitrogen oxides, carbon oxides such as CO and $CO_2$, sulfur oxides, hydrogen, oxygen, unburned hydrocarbons, and other products of incomplete combustion) and/or determine the equivalence ratio, and then control one or more components to adjust the exhaust emissions (e.g., concentration levels in the exhaust gas 42) and/or the equivalence ratio. The controlled components may include any of the components illustrated and described with reference to the drawings, including but not limited to, valves along the supply paths for the oxidant 68, the fuel 70, and the exhaust gas 66; an oxidant compressor, a fuel pump, or any components in the EG processing system 54; any components of the SEGR gas turbine system 52, or any combination thereof. The controlled components may adjust (e.g., increase, decrease, or maintain) the flow rates, temperatures, pressures, or percentages (e.g., equivalence ratio) of the oxidant 68, the fuel 70, and the exhaust gas 66 that combust within the SEGR gas turbine system 52. The controlled components also may include one or more gas treatment systems, such as catalyst units (e.g., oxidation catalyst units), supplies for the catalyst units (e.g., oxidation fuel, heat, electricity, etc.), gas purification and/or separation units (e.g., solvent based separators, absorbers, flash tanks, etc.), and filtration units. The gas treatment systems may help reduce various exhaust emissions along the exhaust recirculation path 110, a vent path (e.g., exhausted into the atmosphere), or an extraction path to the EG supply system 78.

In certain embodiments, the control system 100 may analyze the feedback 130 and control one or more components to maintain or reduce emissions levels (e.g., concentration levels in the exhaust gas 42, 60, 95) to a target range, such as less than approximately 10, 20, 30, 40, 50, 100, 200, 300, 400, 500, 1000, 2000, 3000, 4000, 5000, or 10000 parts per million by volume (ppmv). These target ranges may be the same or different for each of the exhaust emissions, e.g., concentration levels of nitrogen oxides, carbon monoxide, sulfur oxides, hydrogen, oxygen, unburned hydrocarbons, and other products of incomplete combustion. For example, depending on the equivalence ratio, the control system 100 may selectively control exhaust emissions (e.g., concentration levels) of oxidant (e.g., oxygen) within a target range of less than approximately 10, 20, 30, 40, 50, 60, 70, 80, 90, 100, 250, 500, 750, or 1000 ppmv; carbon monoxide (CO) within a target range of less than approximately 20, 50, 100, 200, 500, 1000, 2500, or 5000 ppmv; and nitrogen oxides ($NO_x$) within a target range of less than approximately 50, 100, 200, 300, 400, or 500 ppmv. In certain embodiments operating with a substantially stoichiometric equivalence ratio, the control system 100 may selectively control exhaust emissions (e.g., concentration levels) of oxidant (e.g., oxygen) within a target range of less than approximately 10, 20, 30, 40, 50, 60, 70, 80, 90, or 100 ppmv; and carbon monoxide (CO) within a target range of less than approximately 500, 1000, 2000, 3000, 4000, or 5000 ppmv. In certain embodiments operating with a fuel-lean equivalence ratio (e.g., between approximately 0.95 to 1.0), the control system 100 may selectively control exhaust emissions (e.g., concentration levels) of oxidant (e.g., oxygen) within a target range of less than approximately 500, 600, 700, 800, 900, 1000, 1100, 1200, 1300, 1400, or 1500 ppmv; carbon monoxide (CO) within a target range of less than approximately 10, 20, 30, 40, 50, 60, 70, 80, 90, 100, 150, or 200 ppmv; and nitrogen oxides (e.g., $NO_x$) within a target range of less than approximately 50, 100, 150, 200, 250, 300, 350, or 400 ppmv. The foregoing target ranges are merely examples, and are not intended to limit the scope of the disclosed embodiments.

The control system 100 also may be coupled to a local interface 132 and a remote interface 134. For example, the local interface 132 may include a computer workstation disposed on-site at the turbine-based service system 14 and/or the hydrocarbon production system 12. In contrast, the remote interface 134 may include a computer workstation disposed off-site from the turbine-based service system 14 and the hydrocarbon production system 12, such as through an internet connection. These interfaces 132 and 134 facilitate monitoring and control of the turbine-based service system 14, such as through one or more graphical displays of sensor feedback 130, operational parameters, and so forth.

Again, as noted above, the controller 118 includes a variety of controls 124, 126, and 128 to facilitate control of the turbine-based service system 14. The steam turbine control 124 may receive the sensor feedback 130 and output control commands to facilitate operation of the steam turbine 104. For example, the steam turbine control 124 may receive the sensor feedback 130 from the HRSG 56, the machinery 106, temperature and pressure sensors along a path of the steam 62, temperature and pressure sensors along a path of the water 108, and various sensors indicative of the mechanical power 72 and the electrical power 74. Likewise, the SEGR gas turbine system control 126 may receive sensor feedback 130 from one or more sensors disposed along the SEGR gas turbine system 52, the machinery 106, the EG processing system 54, or any combination thereof. For example, the sensor feedback 130 may be obtained from temperature sensors, pressure sensors, clearance sensors, vibration sensors, flame sensors, fuel composition sensors, exhaust gas composition sensors, or any combination thereof, disposed within or external to the SEGR gas turbine system 52. Finally, the machinery control 128 may receive sensor feedback 130 from various sensors associated with the mechanical power 72 and the electrical power 74, as well as sensors disposed within the machinery 106. Each of these controls 124, 126, and 128 uses the sensor feedback 130 to improve operation of the turbine-based service system 14.

In the illustrated embodiment, the SEGR gas turbine system control 126 may execute instructions to control the quantity and quality of the exhaust gas 42, 60, 95 in the EG processing system 54, the EG supply system 78, the hydrocarbon production system 12, and/or the other systems 84. For example, the SEGR gas turbine system control 126 may maintain a level of oxidant (e.g., oxygen) and/or unburned fuel in the exhaust gas 60 below a threshold suitable for use with the exhaust gas injection EOR system 112. In certain embodiments, the threshold levels may be less than 1, 2, 3, 4, or 5 percent of oxidant (e.g., oxygen) and/or unburned fuel by volume of the exhaust gas 42, 60; or the threshold levels of oxidant (e.g., oxygen) and/or unburned fuel (and other exhaust emissions) may be less than approximately 10, 20, 30, 40, 50, 60, 70, 80, 90, 100, 200, 300, 400, 500, 1000, 2000, 3000, 4000, or 5000 parts per million by volume (ppmv) in the exhaust gas 42, 60. By further example, in order to achieve these low levels of oxidant (e.g., oxygen) and/or unburned fuel, the SEGR gas turbine system control 126 may maintain an equivalence ratio for combustion in the SEGR gas turbine system 52 between approximately 0.95 and approximately 1.05. The SEGR gas turbine system control 126 also may control the EG extraction system 80 and the EG treatment system 82 to maintain the temperature, pressure, flow rate, and gas composition of the exhaust gas

42, 60, 95 within suitable ranges for the exhaust gas injection EOR system 112, the pipeline 86, the storage tank 88, and the carbon sequestration system 90. As discussed above, the EG treatment system 82 may be controlled to purify and/or separate the exhaust gas 42 into one or more gas streams 95, such as the $CO_2$ rich, $N_2$ lean stream 96, the intermediate concentration $CO_2$, $N_2$ stream 97, and the $CO_2$ lean, $N_2$ rich stream 98. In addition to controls for the exhaust gas 42, 60, and 95, the controls 124, 126, and 128 may execute one or more instructions to maintain the mechanical power 72 within a suitable power range, or maintain the electrical power 74 within a suitable frequency and power range.

Figure 3:
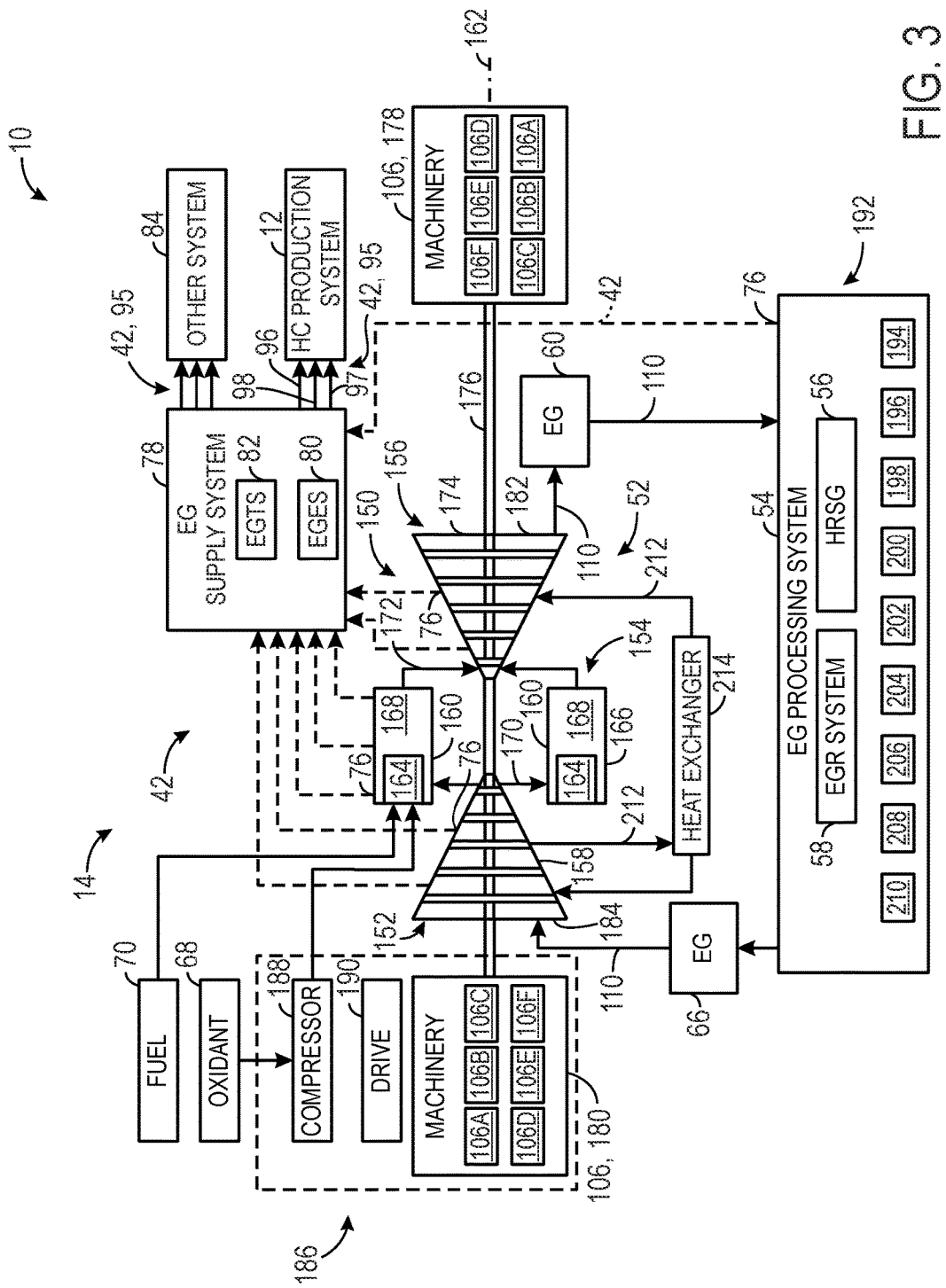
FIG. 3 is a diagram of an embodiment of the system of FIGS. 1 and 2, further illustrating details of a gas turbine engine, exhaust gas supply system, and exhaust gas processing system.

FIG. 3 is a diagram of embodiment of the system 10, further illustrating details of the SEGR gas turbine system 52 for use with the hydrocarbon production system 12 and/or other systems 84. In the illustrated embodiment, the SEGR gas turbine system 52 includes a gas turbine engine 150 coupled to the EG processing system 54. The illustrated gas turbine engine 150 includes a compressor section 152, a combustor section 154, and an expander section or turbine section 156. The compressor section 152 includes one or more exhaust gas compressors or compressor stages 158, such as 1 to 20 stages of rotary compressor blades disposed in a series arrangement. Likewise, the combustor section 154 includes one or more combustors 160, such as 1 to 20 combustors 160 distributed circumferentially about a rotational axis 162 of the SEGR gas turbine system 52. Furthermore, each combustor 160 may include one or more fuel nozzles 164 configured to inject the exhaust gas 66, the oxidant 68, and/or the fuel 70. For example, a head end portion 166 of each combustor 160 may house 1, 2, 3, 4, 5, 6, or more fuel nozzles 164, which may inject streams or mixtures of the exhaust gas 66, the oxidant 68, and/or the fuel 70 into a combustion portion 168 (e.g., combustion chamber) of the combustor 160.

The fuel nozzles 164 may include any combination of premix fuel nozzles 164 (e.g., configured to premix the oxidant 68 and fuel 70 for generation of an oxidant/fuel premix flame) and/or diffusion fuel nozzles 164 (e.g., configured to inject separate flows of the oxidant 68 and fuel 70 for generation of an oxidant/fuel diffusion flame). Embodiments of the premix fuel nozzles 164 may include swirl vanes, mixing chambers, or other features to internally mix the oxidant 68 and fuel 70 within the nozzles 164, prior to injection and combustion in the combustion chamber 168. The premix fuel nozzles 164 also may receive at least some partially mixed oxidant 68 and fuel 70. In certain embodiments, each diffusion fuel nozzle 164 may isolate flows of the oxidant 68 and the fuel 70 until the point of injection, while also isolating flows of one or more diluents (e.g., the exhaust gas 66, steam, nitrogen, or another inert gas) until the point of injection. In other embodiments, each diffusion fuel nozzle 164 may isolate flows of the oxidant 68 and the fuel 70 until the point of injection, while partially mixing one or more diluents (e.g., the exhaust gas 66, steam, nitrogen, or another inert gas) with the oxidant 68 and/or the fuel 70 prior to the point of injection. In addition, one or more diluents (e.g., the exhaust gas 66, steam, nitrogen, or another inert gas) may be injected into the combustor (e.g., into the hot products of combustion) either at or downstream from the combustion zone, thereby helping to reduce the temperature of the hot products of combustion and reduce emissions of $NO_X$ (e.g., NO and $NO_2$). Regardless of the type of fuel nozzle 164, the SEGR gas turbine system 52 may be controlled to provide substantially stoichiometric combustion of the oxidant 68 and fuel 70.

In diffusion combustion embodiments using the diffusion fuel nozzles 164, the fuel 70 and oxidant 68 generally do not mix upstream from the diffusion flame, but rather the fuel 70 and oxidant 68 mix and react directly at the flame surface and/or the flame surface exists at the location of mixing between the fuel 70 and oxidant 68. In particular, the fuel 70 and oxidant 68 separately approach the flame surface (or diffusion boundary/interface), and then diffuse (e.g., via molecular and viscous diffusion) along the flame surface (or diffusion boundary/interface) to generate the diffusion flame. It is noteworthy that the fuel 70 and oxidant 68 may be at a substantially stoichiometric ratio along this flame surface (or diffusion boundary/interface), which may result in a greater flame temperature (e.g., a peak flame temperature) along this flame surface. The stoichiometric fuel/oxidant ratio generally results in a greater flame temperature (e.g., a peak flame temperature), as compared with a fuel-lean or fuel-rich fuel/oxidant ratio. As a result, the diffusion flame may be substantially more stable than a premix flame, because the diffusion of fuel 70 and oxidant 68 helps to maintain a stoichiometric ratio (and greater temperature) along the flame surface. Although greater flame temperatures can also lead to greater exhaust emissions, such as $NO_X$ emissions, the disclosed embodiments use one or more diluents to help control the temperature and emissions while still avoiding any premixing of the fuel 70 and oxidant 68. For example, the disclosed embodiments may introduce one or more diluents separate from the fuel 70 and oxidant 68 (e.g., after the point of combustion and/or downstream from the diffusion flame), thereby helping to reduce the temperature and reduce the emissions (e.g., $NO_X$ emissions) produced by the diffusion flame.

In operation, as illustrated, the compressor section 152 receives and compresses the exhaust gas 66 from the EG processing system 54, and outputs a compressed exhaust gas 170 to each of the combustors 160 in the combustor section 154. Upon combustion of the fuel 60, oxidant 68, and exhaust gas 170 within each combustor 160, additional exhaust gas or products of combustion 172 (i.e., combustion gas) is routed into the turbine section 156. Similar to the compressor section 152, the turbine section 156 includes one or more turbines or turbine stages 174, which may include a series of rotary turbine blades. These turbine blades are then driven by the products of combustion 172 generated in the combustor section 154, thereby driving rotation of a shaft 176 coupled to the machinery 106. Again, the machinery 106 may include a variety of equipment coupled to either end of the SEGR gas turbine system 52, such as machinery 106, 178 coupled to the turbine section 156 and/or machinery 106, 180 coupled to the compressor section 152. In certain embodiments, the machinery 106, 178, 180 may include one or more electrical generators, oxidant compressors for the oxidant 68, fuel pumps for the fuel 70, gear boxes, or additional drives (e.g. steam turbine 104, electrical motor, etc.) coupled to the SEGR gas turbine system 52. Non-limiting examples are discussed in further detail below with reference to TABLE 1. As illustrated, the turbine section 156 outputs the exhaust gas 60 to recirculate along the exhaust recirculation path 110 from an exhaust outlet 182 of the turbine section 156 to an exhaust inlet 184 into the compressor section 152. Along the exhaust recirculation path 110, the exhaust gas 60 passes through the EG processing system 54 (e.g., the HRSG 56 and/or the EGR system 58) as discussed in detail above.

Again, each combustor 160 in the combustor section 154 receives, mixes, and stoichiometrically combusts the compressed exhaust gas 170, the oxidant 68, and the fuel 70 to produce the additional exhaust gas or products of combustion 172 to drive the turbine section 156. In certain embodiments, the oxidant 68 is compressed by an oxidant compression system 186, such as a main oxidant compression (MOC) system (e.g., a main air compression (MAC) system) having one or more oxidant compressors (MOCs). The oxidant compression system 186 includes an oxidant compressor 188 coupled to a drive 190. For example, the drive 190 may include an electric motor, a combustion engine, or any combination thereof. In certain embodiments, the drive 190 may be a turbine engine, such as the gas turbine engine 150. Accordingly, the oxidant compression system 186 may be an integral part of the machinery 106. In other words, the compressor 188 may be directly or indirectly driven by the mechanical power 72 supplied by the shaft 176 of the gas turbine engine 150. In such an embodiment, the drive 190 may be excluded, because the compressor 188 relies on the power output from the turbine engine 150. However, in certain embodiments employing more than one oxidant compressor is employed, a first oxidant compressor (e.g., a low pressure (LP) oxidant compressor) may be driven by the drive 190 while the shaft 176 drives a second oxidant compressor (e.g., a high pressure (HP) oxidant compressor), or vice versa. For example, in another embodiment, the HP MOC is driven by the drive 190 and the LP oxidant compressor is driven by the shaft 176. In the illustrated embodiment, the oxidant compression system 186 is separate from the machinery 106. In each of these embodiments, the compression system 186 compresses and supplies the oxidant 68 to the fuel nozzles 164 and the combustors 160. Accordingly, some or all of the machinery 106, 178, 180 may be configured to increase the operational efficiency of the compression system 186 (e.g., the compressor 188 and/or additional compressors).

The variety of components of the machinery 106, indicated by element numbers 106A, 106B, 106C, 106D, 106E, and 106F, may be disposed along the line of the shaft 176 and/or parallel to the line of the shaft 176 in one or more series arrangements, parallel arrangements, or any combination of series and parallel arrangements. For example, the machinery 106, 178, 180 (e.g., 106A through 106F) may include any series and/or parallel arrangement, in any order, of: one or more gearboxes (e.g., parallel shaft, epicyclic gearboxes), one or more compressors (e.g., oxidant compressors, booster compressors such as EG booster compressors), one or more power generation units (e.g., electrical generators), one or more drives (e.g., steam turbine engines, electrical motors), heat exchange units (e.g., direct or indirect heat exchangers), clutches, or any combination thereof. The compressors may include axial compressors, radial or centrifugal compressors, or any combination thereof, each having one or more compression stages. Regarding the heat exchangers, direct heat exchangers may include spray coolers (e.g., spray intercoolers), which inject a liquid spray into a gas flow (e.g., oxidant flow) for direct cooling of the gas flow. Indirect heat exchangers may include at least one wall (e.g., a shell and tube heat exchanger) separating first and second flows, such as a fluid flow (e.g., oxidant flow) separated from a coolant flow (e.g., water, air, refrigerant, or any other liquid or gas coolant), wherein the coolant flow transfers heat from the fluid flow without any direct contact. Examples of indirect heat exchangers include intercooler heat exchangers and heat recovery units, such as heat recovery steam generators. The heat exchangers also may include heaters. As discussed in further detail below, each of these machinery components may be used in various combinations as indicated by the non-limiting examples set forth in TABLE 1.

Generally, the machinery 106, 178, 180 may be configured to increase the efficiency of the compression system 186 by, for example, adjusting operational speeds of one or more oxidant compressors in the system 186, facilitating compression of the oxidant 68 through cooling, and/or extraction of surplus power. The disclosed embodiments are intended to include any and all permutations of the foregoing components in the machinery 106, 178, 180 in series and parallel arrangements, wherein one, more than one, all, or none of the components derive power from the shaft 176. As illustrated below, TABLE 1 depicts some non-limiting examples of arrangements of the machinery 106, 178, 180 disposed proximate and/or coupled to the compressor and turbine sections 152, 156.

TABLE 1

| 106A | 106B | 106C | 106D | 106E | 106F |
|------|------|------|------|------|------|
| MOC | GEN | | | | |
| MOC | GBX | GEN | | | |
| LP MOC | HP MOC | GEN | | | |
| HP MOC | GBX | LP MOC | GEN | | |
| MOC | GBX | GEN | | | |
| MOC | | | | | |
| HP MOC | GBX | GEN | LP MOC | | |
| MOC | GBX | GEN | | | |
| MOC | GBX | DRV | | | |
| DRV | GBX | LP MOC | HP MOC | GBX | GEN |
| DRV | GBX | HP MOC | LP MOC | GEN | |
| HP MOC | GBX | LP MOC | GEN | | |
| | CLR | | | | |
| HP MOC | GBX | LP MOC | GBX | GEN | |
| | CLR | | | | |
| HP MOC | GBX | LP MOC | GEN | | |
| | HTR STGN | | | | |
| MOC | GEN | DRV | | | |
| MOC | DRV | GEN | | | |
| DRV | MOC | GEN | | | |
| DRV | CLU | MOC | GEN | | |
| DRV | CLU | MOC | GBX | GEN | |

As illustrated above in TABLE 1, a cooling unit is represented as CLR, a clutch is represented as CLU, a drive is represented by DRV, a gearbox is represented as GBX, a generator is represented by GEN, a heating unit is represented by HTR, a main oxidant compressor unit is represented by MOC, with low pressure and high pressure variants being represented as LP MOC and HP MOC, respectively, and a steam generator unit is represented as STGN. Although TABLE 1 illustrates the machinery 106, 178, 180 in sequence toward the compressor section 152 or the turbine section 156, TABLE 1 is also intended to cover the reverse sequence of the machinery 106, 178, 180. In TABLE 1, any cell including two or more components is intended to cover a parallel arrangement of the components. TABLE 1 is not intended to exclude any non-illustrated permutations of the machinery 106, 178, 180. These components of the machinery 106, 178, 180 may enable feedback control of temperature, pressure, and flow rate of the oxidant 68 sent to the gas turbine engine 150. As discussed in further detail below, the oxidant 68 and the fuel 70 may be supplied to the gas turbine engine 150 at locations specifically selected to facilitate isolation and extraction of the compressed exhaust gas 170 without any oxidant 68 or fuel 70 degrading the quality of the exhaust gas 170.

The EG supply system 78, as illustrated in FIG. 3, is disposed between the gas turbine engine 150 and the target systems (e.g., the hydrocarbon production system 12 and the other systems 84). In particular, the EG supply system 78, e.g., the EG extraction system (EGES) 80), may be coupled to the gas turbine engine 150 at one or more extraction points 76 along the compressor section 152, the combustor section 154, and/or the turbine section 156. For example, the extraction points 76 may be located between adjacent compressor stages, such as 2, 3, 4, 5, 6, 7, 8, 9, or 10 interstage extraction points 76 between compressor stages. Each of these interstage extraction points 76 provides a different temperature and pressure of the extracted exhaust gas 42. Similarly, the extraction points 76 may be located between adjacent turbine stages, such as 2, 3, 4, 5, 6, 7, 8, 9, or 10 interstage extraction points 76 between turbine stages. Each of these interstage extraction points 76 provides a different temperature and pressure of the extracted exhaust gas 42. By further example, the extraction points 76 may be located at a multitude of locations throughout the combustor section 154, which may provide different temperatures, pressures, flow rates, and gas compositions. Each of these extraction points 76 may include an EG extraction conduit, one or more valves, sensors, and controls, which may be used to selectively control the flow of the extracted exhaust gas 42 to the EG supply system 78.

The extracted exhaust gas 42, which is distributed by the EG supply system 78, has a controlled composition suitable for the target systems (e.g., the hydrocarbon production system 12 and the other systems 84). For example, at each of these extraction points 76, the exhaust gas 170 may be substantially isolated from injection points (or flows) of the oxidant 68 and the fuel 70. In other words, the EG supply system 78 may be specifically designed to extract the exhaust gas 170 from the gas turbine engine 150 without any added oxidant 68 or fuel 70. Furthermore, in view of the stoichiometric combustion in each of the combustors 160, the extracted exhaust gas 42 may be substantially free of oxygen and fuel. The EG supply system 78 may route the extracted exhaust gas 42 directly or indirectly to the hydrocarbon production system 12 and/or other systems 84 for use in various processes, such as enhanced oil recovery, carbon sequestration, storage, or transport to an offsite location. However, in certain embodiments, the EG supply system 78 includes the EG treatment system (EGTS) 82 for further treatment of the exhaust gas 42, prior to use with the target systems. For example, the EG treatment system 82 may purify and/or separate the exhaust gas 42 into one or more streams 95, such as the $CO_2$ rich, $N_2$ lean stream 96, the intermediate concentration $CO_2$, $N_2$ stream 97, and the $CO_2$ lean, $N_2$ rich stream 98. These treated exhaust gas streams 95 may be used individually, or in any combination, with the hydrocarbon production system 12 and the other systems 84 (e.g., the pipeline 86, the storage tank 88, and the carbon sequestration system 90).

Similar to the exhaust gas treatments performed in the EG supply system 78, the EG processing system 54 may include a plurality of exhaust gas (EG) treatment components 192, such as indicated by element numbers 194, 196, 198, 200, 202, 204, 206, 208, and 210. These EG treatment components 192 (e.g., 194 through 210) may be disposed along the exhaust recirculation path 110 in one or more series arrangements, parallel arrangements, or any combination of series and parallel arrangements. For example, the EG treatment components 192 (e.g., 194 through 210) may include any series and/or parallel arrangement, in any order, of: one or more heat exchangers (e.g., heat recovery units such as heat recovery steam generators, condensers, coolers, or heaters), catalyst systems (e.g., oxidation catalyst systems), particulate and/or water removal systems (e.g., inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, or any combination thereof. In certain embodiments, the catalyst systems may include an oxidation catalyst, a carbon monoxide reduction catalyst, a nitrogen oxides reduction catalyst, an aluminum oxide, a zirconium oxide, a silicone oxide, a titanium oxide, a platinum oxide, a palladium oxide, a cobalt oxide, or a mixed metal oxide, or a combination thereof. The disclosed embodiments are intended to include any and all permutations of the foregoing components 192 in series and parallel arrangements. As illustrated below, TABLE 2 depicts some non-limiting examples of arrangements of the components 192 along the exhaust recirculation path 110.

TABLE 2

| 194 | 196 | 198 | 200 | 202 | 204 | 206 | 208 | 210 |
|---|---|---|---|---|---|---|---|---|
| CU | HRU | BB | MRU | PRU | | | | |
| CU | HRU | HRU | BB | MRU | PRU | DIL | | |
| CU | HRSG | HRSG | BB | MRU | PRU | | | |
| OCU | HRU | OCU | HRU | OCU | BB | MRU | PRU | |
| HRU<br>CU | HRU<br>CU | BB | MRU | PRU | | | | |
| HRSG<br>OCU | HRSG<br>OCU | BB | MRU | PRU | DIL | | | |
| OCU | HRSG<br>OCU | OCU | HRSG<br>OCU | OCU | BB | MRU | PRU | DIL |
| OCU | HRSG<br>ST | HRSG<br>ST | BB | COND | INER | WFIL | CFIL | DIL |
| OCU<br>HRSG<br>ST | OCU<br>HRSG<br>ST | BB | COND | INER | FIL | DIL | | |
| OCU | HRSG<br>ST | HRSG<br>ST | OCU | BB | MRU<br>HE<br>COND | MRU<br>WFIL | PRU<br>INER | PRU<br>FIL<br>CFIL |
| CU | HRU<br>COND | HRU<br>COND | HRU<br>COND | BB | MRU<br>HE<br>COND<br>WFIL | PRU<br>INER | PRU<br>FIL<br>CFIL | DIL |

As illustrated above in TABLE 2, a catalyst unit is represented by CU, an oxidation catalyst unit is represented by OCU, a booster blower is represented by BB, a heat exchanger is represented by HX, a heat recovery unit is represented by HRU, a heat recovery steam generator is represented by HRSG, a condenser is represented by COND, a steam turbine is represented by ST, a particulate removal unit is represented by PRU, a moisture removal unit is represented by MRU, a filter is represented by FIL, a coalescing filter is represented by CFIL, a water impermeable filter is represented by WFIL, an inertial separator is represented by INER, and a diluent supply system (e.g., steam, nitrogen, or other inert gas) is represented by DIL. Although TABLE 2 illustrates the components 192 in sequence from the exhaust outlet 182 of the turbine section 156 toward the exhaust inlet 184 of the compressor section 152, TABLE 2 is also intended to cover the reverse sequence of the illustrated components 192. In TABLE 2, any cell including two or more components is intended to cover an integrated unit with the components, a parallel arrangement of the components, or any combination thereof. Furthermore, in context of TABLE 2, the HRU, the HRSG, and the COND are examples of the HE; the HRSG is an example of the HRU; the COND, WFIL, and CFIL are examples of the WRU; the INER, FIL, WFIL, and CFIL are examples of the PRU; and the WFIL and CFIL are examples of the FIL. Again, TABLE 2 is not intended to exclude any non-illustrated permutations of the components 192. In certain embodiments, the illustrated components 192 (e.g., 194 through 210) may be partially or completed integrated within the HRSG 56, the EGR system 58, or any combination thereof. These EG treatment components 192 may enable feedback control of temperature, pressure, flow rate, and gas composition, while also removing moisture and particulates from the exhaust gas 60. Furthermore, the treated exhaust gas 60 may be extracted at one or more extraction points 76 for use in the EG supply system 78 and/or recirculated to the exhaust inlet 184 of the compressor section 152.

As the treated, recirculated exhaust gas 66 passes through the compressor section 152, the SEGR gas turbine system 52 may bleed off a portion of the compressed exhaust gas along one or more lines 212 (e.g., bleed conduits or bypass conduits). Each line 212 may route the exhaust gas into one or more heat exchangers 214 (e.g., cooling units), thereby cooling the exhaust gas for recirculation back into the SEGR gas turbine system 52. For example, after passing through the heat exchanger 214, a portion of the cooled exhaust gas may be routed to the turbine section 156 along line 212 for cooling and/or sealing of the turbine casing, turbine shrouds, bearings, and other components. In such an embodiment, the SEGR gas turbine system 52 does not route any oxidant 68 (or other potential contaminants) through the turbine section 156 for cooling and/or sealing purposes, and thus any leakage of the cooled exhaust gas will not contaminate the hot products of combustion (e.g., working exhaust gas) flowing through and driving the turbine stages of the turbine section 156. By further example, after passing through the heat exchanger 214, a portion of the cooled exhaust gas may be routed along line 216 (e.g., return conduit) to an upstream compressor stage of the compressor section 152, thereby improving the efficiency of compression by the compressor section 152. In such an embodiment, the heat exchanger 214 may be configured as an interstage cooling unit for the compressor section 152. In this manner, the cooled exhaust gas helps to increase the operational efficiency of the SEGR gas turbine system 52, while simultaneously helping to maintain the purity of the exhaust gas (e.g., substantially free of oxidant and fuel).

Figure 4:
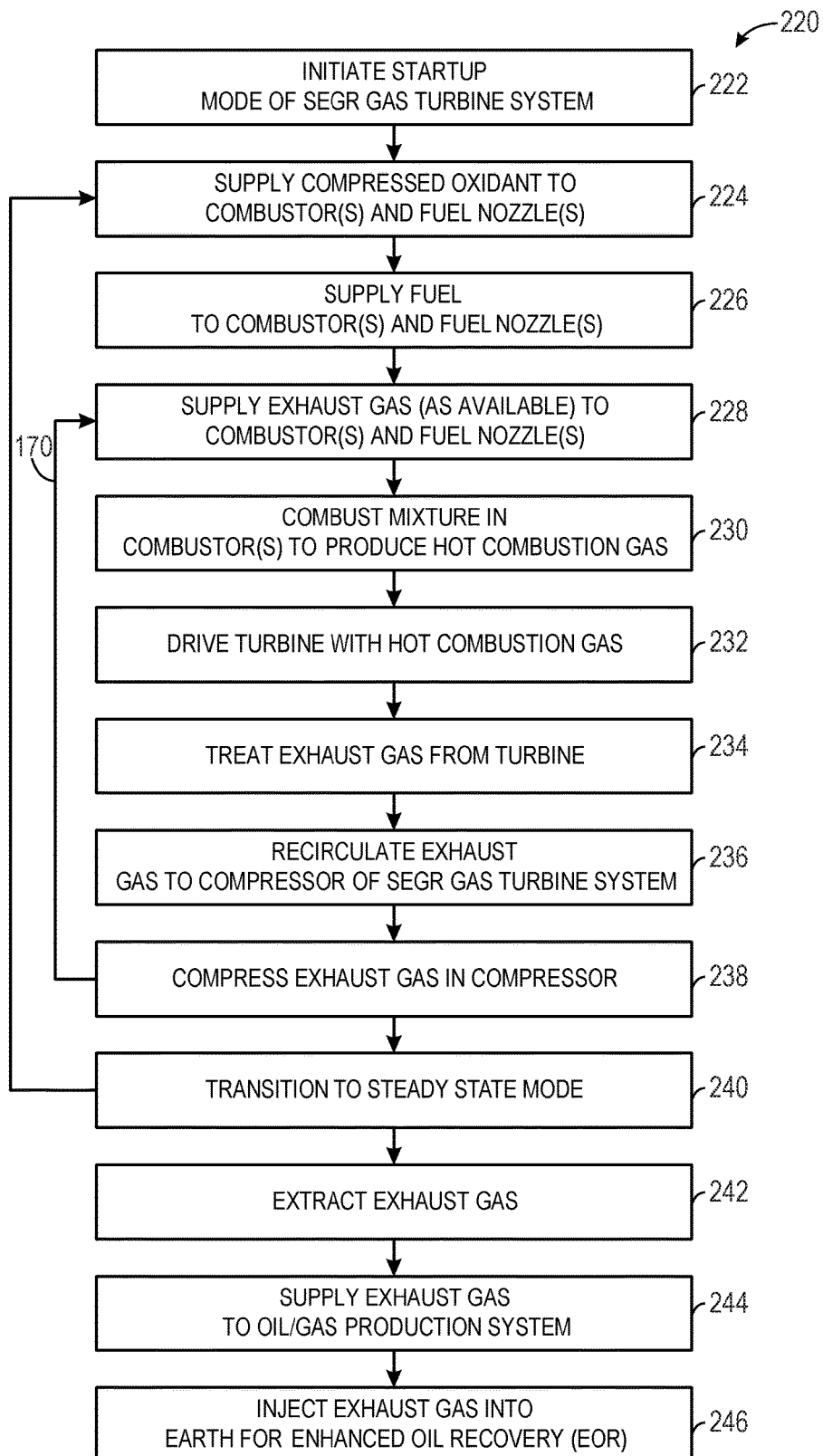
FIG. 4 is a flow chart of an embodiment of a process for operating the system of FIGS. 1-3.

FIG. 4 is a flow chart of an embodiment of an operational process 220 of the system 10 illustrated in FIGS. 1-3. In certain embodiments, the process 220 may be a computer implemented process, which accesses one or more instructions stored on the memory 122 and executes the instructions on the processor 120 of the controller 118 shown in FIG. 2. For example, each step in the process 220 may include instructions executable by the controller 118 of the control system 100 described with reference to FIG. 2.

The process 220 may begin by initiating a startup mode of the SEGR gas turbine system 52 of FIGS. 1-3, as indicated by block 222. For example, the startup mode may involve a gradual ramp up of the SEGR gas turbine system 52 to maintain thermal gradients, vibration, and clearance (e.g., between rotating and stationary parts) within acceptable thresholds. For example, during the startup mode 222, the process 220 may begin to supply a compressed oxidant 68 to the combustors 160 and the fuel nozzles 164 of the combustor section 154, as indicated by block 224. In certain embodiments, the compressed oxidant may include a compressed air, oxygen, oxygen-enriched air, oxygen-reduced air, oxygen-nitrogen mixtures, or any combination thereof. For example, the oxidant 68 may be compressed by the oxidant compression system 186 illustrated in FIG. 3. The process 220 also may begin to supply fuel to the combustors 160 and the fuel nozzles 164 during the startup mode 222, as indicated by block 226. During the startup mode 222, the process 220 also may begin to supply exhaust gas (as available) to the combustors 160 and the fuel nozzles 164, as indicated by block 228. For example, the fuel nozzles 164 may produce one or more diffusion flames, premix flames, or a combination of diffusion and premix flames. During the startup mode 222, the exhaust gas 60 being generated by the gas turbine engine 156 may be insufficient or unstable in quantity and/or quality. Accordingly, during the startup mode, the process 220 may supply the exhaust gas 66 from one or more storage units (e.g., storage tank 88), the pipeline 86, other SEGR gas turbine systems 52, or other exhaust gas sources.

The process 220 may then combust a mixture of the compressed oxidant, fuel, and exhaust gas in the combustors 160 to produce hot combustion gas 172, as indicated by block 230 by the one or more diffusion flames, premix flames, or a combination of diffusion and premix flames. In particular, the process 220 may be controlled by the control system 100 of FIG. 2 to facilitate stoichiometric combustion (e.g., stoichiometric diffusion combustion, premix combustion, or both) of the mixture in the combustors 160 of the combustor section 154. However, during the startup mode 222, it may be particularly difficult to maintain stoichiometric combustion of the mixture (and thus low levels of oxidant and unburned fuel may be present in the hot combustion gas 172). As a result, in the startup mode 222, the hot combustion gas 172 may have greater amounts of residual oxidant 68 and/or fuel 70 than during a steady state mode as discussed in further detail below. For this reason, the process 220 may execute one or more control instructions to reduce or eliminate the residual oxidant 68 and/or fuel 70 in the hot combustion gas 172 during the startup mode.

The process 220 then drives the turbine section 156 with the hot combustion gas 172, as indicated by block 232. For example, the hot combustion gas 172 may drive one or more turbine stages 174 disposed within the turbine section 156. Downstream of the turbine section 156, the process 220 may treat the exhaust gas 60 from the final turbine stage 174, as indicated by block 234. For example, the exhaust gas treatment 234 may include filtration, catalytic reaction of any residual oxidant 68 and/or fuel 70, chemical treatment, heat recovery with the HRSG 56, and so forth. The process 220 may also recirculate at least some of the exhaust gas 60 back to the compressor section 152 of the SEGR gas turbine system 52, as indicated by block 236. For example, the exhaust gas recirculation 236 may involve passage through the exhaust recirculation path 110 having the EG processing system 54 as illustrated in FIGS. 1-3.

In turn, the recirculated exhaust gas 66 may be compressed in the compressor section 152, as indicated by block 238. For example, the SEGR gas turbine system 52 may sequentially compress the recirculated exhaust gas 66 in one or more compressor stages 158 of the compressor section 152. Subsequently, the compressed exhaust gas 170 may be supplied to the combustors 160 and fuel nozzles 164, as indicated by block 228. Steps 230, 232, 234, 236, and 238 may then repeat, until the process 220 eventually transitions to a steady state mode, as indicated by block 240. Upon the transition 240, the process 220 may continue to perform the steps 224 through 238, but may also begin to extract the exhaust gas 42 via the EG supply system 78, as indicated by block 242. For example, the exhaust gas 42 may be extracted from one or more extraction points 76 along the compressor section 152, the combustor section 154, and the turbine section 156 as indicated in FIG. 3. In turn, the process 220 may supply the extracted exhaust gas 42 from the EG supply system 78 to the hydrocarbon production system 12, as indicated by block 244. The hydrocarbon production system 12 may then inject the exhaust gas 42 into the earth 32 for enhanced oil recovery, as indicated by block 246. For example, the extracted exhaust gas 42 may be used by the exhaust gas injection EOR system 112 of the EOR system 18 illustrated in FIGS. 1-3.

As set forth above, in certain embodiments, the combustors 160 of the gas turbine engine 150 may operate using different equivalence ratios, where the equivalence ratios of combustion are selected based on a number of operating parameters such as for load control, controlling the amount of oxidant remaining in the exhaust gas 170, controlling flame temperature in the combustors 160, and so forth. Indeed, because the gas turbine engines 150 may be responsible for powering thousands (and even hundreds of thousands) of homes, there are a number of significant considerations when determining the manner in which combustion occurs in the combustors 160, beyond any one single parameter. Indeed, in certain combustion regimes, such as in substantially stoichiometric combustion regimes (e.g., between 0.95 and 1.05 combustion equivalence ratio) as described herein, the amount of unreacted oxidant and the heat release of the combustors tends to be more heavily favored as a controlled parameter as opposed to, for example, soot production. Indeed, soot production is generally favored over, for example, the production of regulated gases such as nitrogen oxides. Accordingly, combustion equivalence ratios are not generally controlled to control the presence of certain byproducts, and in particular those such as soot.

Continuing with the example of soot as a byproduct, the soot may be removed using, for example, elements of the EG processing system 54 described above. However, as set forth above, it is now recognized that while these byproducts can be removed, it may be desirable to mitigate their production in the combustors 160 using certain of the embodiments disclosed herein. For example, soot can have various effects on the operation of the gas turbine engine 150 and, although it can be removed, may utilize additional resources that could otherwise be saved if the soot were not produced. The inventors have found that in the systems described herein, fuel staging within combustors may be performed in a manner that discourages soot (and potentially other byproduct) formation while still enabling the gas turbine engine 150 to meet its other operating objectives (e.g., other emission parameters, power outputs).

Figure 5:
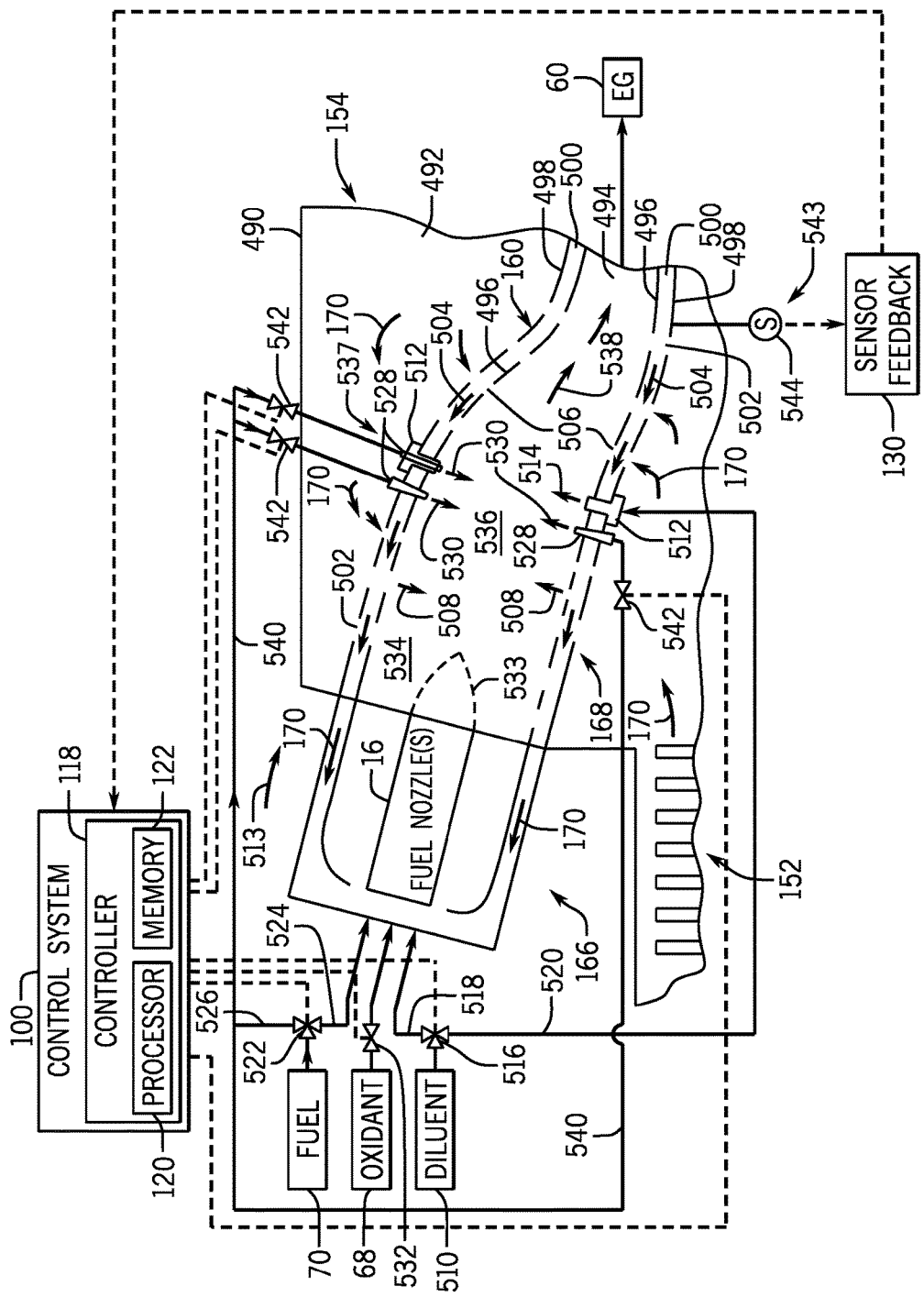
FIG. 5 is a schematic diagram of an embodiment of a combustor section of a gas turbine engine and a control system for controlling fuel staging in accordance with the present disclosure.

Illustratively, FIG. 5 depicts an embodiment of the gas turbine engine 150 and, more specifically, an embodiment of the combustor section 154 and the control system 100 configured to perform fuel staging in accordance with the present disclosure. As illustrated, the combustor section 154 includes a casing 490 disposed about one or more combustors 160, thereby defining a compressor discharge cavity 492 between the casing 490 and the combustor 160. Each combustor 160 includes a respective head end portion 166 and combustion portion 168. The combustion portion 168 may include a chamber 494, a first wall or liner 496 disposed about the chamber 494, and a second wall or flow sleeve 498 disposed at an offset around the first wall 496. By way of example, the first and second walls 496 and 498 may be generally coaxial with one another to define a hollow circumferential space or flow passage 500 leading from the combustion portion 168 to the head end portion 166. The second wall or flow sleeve 498 may include a plurality of openings or perforations 502, which enables the compressed exhaust gas 170 from the compressor section 152 of FIG. 3 to enter into the flow passage 500. The exhaust gas 170 then flows through the passage 500 along the liner 496 toward the head end portion 166 as indicated by arrows 504, thereby cooling the liner 496 as the exhaust gas 170 flows toward the head end portion 166 for delivery into the chamber 494 (e.g., through the one or more fuel nozzles 164).

In certain embodiments, the liner 496 also may include one or more openings or perforations 506, thereby enabling injection of a portion of the exhaust gas 170 directly into the chamber 494 as indicated by arrows 508. For example, the exhaust gas injection 508 may serve as a diluent injection, which may be used by the control system 100 to control the temperature, pressure, flow rate, gas composition (e.g., emissions levels), or any combination thereof, within the chamber 494. Additionally or alternatively, one or more additional diluents 510, such as nitrogen, steam, other inert gases, or additional exhaust gas, may be injected through one or more diluent injectors 512 coupled to each combustor 160 downstream (e.g., as indicated by an arrow 513) of the head end portion 166. The one or more diluent injectors 512 may extend through the first and second walls 496 and 498 to the chamber 494 of the combustor 160, and are configured to inject a fluid (e.g., diluents) into the chamber 494, as indicated by arrows 514. Further, in certain embodiments, the compressed exhaust gas 170 may be introduced as a diluent primarily by the diluent injectors 512, though a combination of the injection methods disclosed herein may be utilized. In this regard, together, the exhaust gas injection 508 and additional (or alternative) diluent injection 514 may be controlled to adjust the temperature, concentration levels of certain emissions, or other characteristics of the hot combustion gases flowing through the chamber 494.

As illustrated, the one or more diluents 510 (e.g., exhaust gas, steam, nitrogen, other inert gases, or any combination thereof) may be supplied to each combustor 160 via a flow distributor, illustrated as a three-way valve 516. The three-way valve 516 (and/or other feature used for flow distribution), may controllably distribute the diluents 510 into multiple diluent streams (e.g., two output streams, three output streams, or more), depending on the particular manner in which the diluents are introduced to the combustor 160. In FIG. 5, a first diluent stream 518 is directed along one or more flow paths (e.g., conduits, flow lines, circuits) from the three-way valve 516 to the one or more fuel nozzles 164 in the head end portion 166 of the combustor 160 to facilitate mixing of the fuel, oxidant, and diluent either before or after introduction into the combustor 160 (e.g., depending on whether the combustion is diffusion-based or premixed-based). A second diluent stream 520 is directed from the three-way valve 516 and along one or more flow paths (e.g., conduits, flow lines, circuits) to one or more of the diluent injectors 512. The control system 100 may control the three-way valve 516 (and/or other flow distributor) to adjust the distribution of the diluents 510 between the first diluent stream 518 and the second diluent stream 520 in any suitable manner. Non-limiting examples of flow distributors may include any one or a combination of three-way valves, flow headers, or any other suitable flow distribution device capable of controllably diverting flows from a source of the diluents and to different portions of the combustor 160.

Moving now to the fuel 70 used within the combustors 160, various aspects of the fuel staging of the present disclosure may be further appreciated with reference to a system configuration of the gas turbine engine 150 and the operational control thereof. Again, the presently disclosed fuel staging may reduce the levels of the soot and/or ammonium emissions in the exhaust gas 60, though other technical effects may be realized and are within the scope of this disclosure.

Referring now to the example configuration of the gas turbine engine 150 as it relates to the provision of fuel 70 for combustion, as illustrated, the fuel 70 may be supplied to the combustor 160 using a corresponding fuel flow distributor, illustrated as a three-way valve 522. The fuel 70 may be distributed by any suitable fuel flow distributor capable of regulating the flow of fuel 70 provided to one or more fuel supply streams directed to the combustor 160. By way of non-limiting example, a fuel flow header, one or more flow control valves, valve diverters, and so forth, may be used alone or in combination as a fuel flow distributor. In the illustrated embodiment of FIG. 5, the fuel 70 is split into two output streams from the three-way valve 522, including a first fuel stream 524 and a second fuel stream 524. The first fuel stream 524 is directed along one or more flow paths (e.g., conduits, flow lines, circuits) to the one or more fuel nozzles 164 in the head end portion 166 of the combustor 160. As noted above with respect to the diluent provided to the fuel nozzles 164, the provision of fuel 70, oxidant 68, and diluent to the fuel nozzles 164 may facilitate mixing of these components in a predetermined manner to achieve certain combustion characteristics.

The second fuel stream 526 is directed from the three-way valve 522 along one or more flow paths (e.g., conduits, flow lines, circuits) to one or more fuel injectors 528 coupled to the combustor 160 downstream (e.g., as indicated by the arrow 513) of the head end portion 166. The one or more fuel injectors 528, as illustrated, extend through the first and second walls 496 and 498 to the chamber 494 of the combustor 160, and are configured to introduce the fuel 70 into the chamber 494, as indicated by arrows 530. While illustrated as being disposed at opposite extents of the combustor 160, the one or more fuel injectors 528 may be distributed in any suitable manner along the combustor 160, including circumferentially around its perimeter (e.g., circumferentially around the first and second walls 496, 498), axially along its perimeter (e.g., in the downstream direction 513), or in any other suitable arrangement, the suitability of which may be further appreciated with reference to the aspects of controlling the fuel staging described below. For instance, as described in further detail below, the control system 100 may control the three-way valve 522 to adjust the distribution of the fuel 70 between the first fuel stream 524 and the second fuel stream 526 in any suitable manner, to adjust the amount of fuel 70 introduced to different axial and/or circumferential positions along the chamber 494 relative to the amount of fuel 70 introduced at the head end 166 by the fuel nozzles 164.

In the head end portion 166, the one or more fuel nozzles 164 may route the exhaust gas 170, the oxidant 68, the fuel 70 (e.g., the first fuel stream 524), and the one or more diluents 510 (e.g., the first diluent stream 518) into the chamber 494 at a first axial position proximate the head end 166 (e.g., at or proximate a first interior region 534 at or near the one or more fuel nozzles 164) for combustion. For example, the oxidant 68 may be supplied to the one or more fuel nozzles 164 via a flow valve 532, and the control system 100 may control the adjust a position of the flow valve 532 to adjust the flow rate (or quantity) of the oxidant 68 delivered to the one or more fuel nozzles 164. Each combustor 160 may include 1, 2, 3, 4, 5, 6, 7, 8, or more fuel nozzles 164, each configured as a diffusion fuel nozzle or a premix fuel nozzle. For example, each fuel nozzle 164 may deliver the oxidant 68, the fuel 70 (e.g., the first fuel stream 524), the diluents 510 (e.g., the first diluent stream 518), and/or the exhaust gas 170 as premixed or independent streams into the chamber 494, thereby generating a flame 533 about the one or more fuel nozzles 164. The premixed streams of oxidant 68 and fuel 70 result in a premix flame, whereas separate streams of oxidant 68 and fuel 70 result in a diffusion flame.

As noted above, the one or more fuel injectors 528 are coupled to the combustor 160 downstream of the head end portion 166. The one or more fuel injectors 528 are structurally supported by and extend through the first and second walls 496 and 498 to a second interior region 536 of the chamber 494, which is downstream of the first interior region 534. The one or more fuel injectors 528 may extend into the second interior region 536 by the same or different amounts. Each of the one or more fuel injectors 528 is configured to supply at least a portion of the fuel 70 (e.g., the second fuel stream 526) to the second interior region 536, for example, by fuel injection in the direction 530 that is generally transverse to a predominant flow direction (e.g., the direction 513) of mass flow through the chamber 494. The portion of the fuel 70 that is injected into the second interior region 536 by the one or more fuel injectors 528 may be combusted separately from the portion of the fuel 70 that is injected by the one or more fuel nozzles 164 in the head end 166 (e.g., the flame 533 in the first interior region 534). As such, conditions within the combustor 160 may be staged to create local zones of combustion (e.g., in the first interior region 534 and the second interior region 536) that, in sum, encourage combustion products that more closely resemble combustion products produced at the intended combustion equivalence ratio.

Indeed, it is presently recognized that, especially in substantially stoichiometric conditions, if all the oxidant 68 and fuel 70 utilized for combustion is provided at the head end portion 166, localized fuel-rich combustion may occur due (at least in part) to delays in diffusion of oxidant 68 into the fuel 70 and vice-versa. This is particularly true in configurations where the fuel nozzles 164 are diffusion fuel nozzles. In other words, even if the intended combustion equivalence ratio is exactly 1, insufficient mixing of the oxidant 68 and the fuel 70 may encourage the formation of combustion products similar to those produced during fuel-rich combustion, such as soot, due at least in part to mixing and diffusion delays. By staging the fuel introduction in accordance with present embodiments, combustion at a first combustion equivalence ratio (e.g., an oxidant-rich equivalence ratio) may be encouraged in and around the first interior region 534 so as to completely combust the fuel 70 provided thereto. In certain configurations (e.g., where the gas turbine engine 150 is a ULET gas turbine engine in accordance with present embodiments), a remainder of the fuel 70 may be provided to the second interior region 536 (e.g., using the fuel injectors 528 and/or diluent injectors 512 and/or both) so as to encourage consumption of substantially all the remaining oxidant 68 and thereby obtain an overall combustion equivalence ratio for the combustor 160 that is much closer in practice to the intended combustion equivalence ratio than would otherwise be obtained.

To enable appropriate introduction of the fuel 70 into the combustor 160, each of the one or more fuel injectors 528 may be any suitable type of injector capable of handling gaseous and/or liquid fuel, including, but not limited to, a tube-in-tube injector, a swirl injector, a rich catalytic injector, a multi-tube or showerhead injector, and so forth. Regarding the manner in which the fuel injectors are integrated with the combustor 160, in some embodiments, the one or more fuel injectors 528 may be coupled to the combustor 160 about the second interior region 536 at locations that correspond to pre-existing openings or perforations 502, 506 of the second and first walls 498, 496, respectively. In certain embodiments, the one or more fuel injectors 528 may be coupled to (e.g., disposed within, integrated with) the one or more diluent injectors 512 such that the one or more diluent injectors 512 may be configured to deliver the diluents 510, the fuel 70, or a combination thereof, into the chamber 494. In the illustrated embodiment, one fuel injector 528 is integrated with one of the diluent injectors 512 to produce a combined injector 537. Further still, in certain embodiments, such as when the combustor 160 is a ULET combustor, at least a portion of the fuel 70 (e.g., the second fuel stream 526) may be directly injected into the chamber 494 via the one or more diluent injectors 512, thereby potentially reducing manufacturing costs and encouraging a certain amount of mixing of the diluent and the fuel 70 before combustion. In other embodiments, the one or more fuel injectors 528 may be coupled to the combustor 160 via specially designed (e.g., specific to the structure and/or function of the fuel injector 528) openings, fittings, materials, and so forth.

Moving now to the illustrated control system 100, in accordance with the present disclosure, the control system 100 is configured to control various parameters (e.g., pressure, temperature, flow rate, mixing, or the like) of the oxidant 68, the fuel 70, the diluents 510, and/or the exhaust gas 170. For example, the control system 100 may independently control flows of the oxidant 68, the fuel 70, the diluents 514, and/or the exhaust gas 170 in order to control the equivalence ratio, emissions levels (e.g. carbon monoxide, nitrogen oxides, sulfur oxides, unburned hydrocarbons, hydrogen, and/or oxygen), power output, or any combination thereof. For example, the control system 100 may control the flow valve 532 and the three-way valve 522, respectively, (e.g., flow regulation equipment) to increase or decrease the flows of oxidant 68 and fuel 70 while maintaining substantially stoichiometric combustion. The control system 100 may perform each of these increases or decreases in flow rates of the oxidant 68 and the fuel 70 in incremental steps (e.g., 1, 2, 3, 4, 5, or more steps), continuously, or any combination thereof. Furthermore, the control system 100 may control the flow valve 532 and the three-way valve 522, respectively, to increase or decrease the flows of oxidant 68 and fuel 70 in order to provide a fuel rich mixture, a fuel lean mixture, or any other mixture of the oxidant 68 and the fuel 70, into all or only certain predefined zones of the chamber 494, thereby creating products of combustion 538 (e.g., combustion products 172 of FIG. 3) with a set of predefined characteristics. Example characteristics of the products of combustion 538 may include those noted above, such as combustion gases having less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburned fuel or hydrocarbons (e.g., HCs), nitrogen oxides (e.g., $NO_x$), carbon monoxide (CO), sulfur oxides (e.g., $SO_x$), hydrogen, and other products of incomplete combustion such as soot. While controlling the flows of oxidant 68 and fuel 70, the control system 100 also may control the three-way valve 516 to increase or decrease flow of the diluents 510 (e.g., steam, exhaust gas, nitrogen, or any other inert gas), thereby helping to control the temperature, pressure, flow rate, or any combination thereof, of the hot products of combustion 538 passing through the chamber 494 toward the turbine section 156.

As noted above, when substantially stoichiometric combustion is targeted within the combustor 160 but all the fuel 70 is provided in one region (e.g., one axial region or "stage", such as at the head end portion 166), areas of the combustor 160 may include zones where combustion approximates combustion at a high equivalence ratio (e.g., fuel rich combustion). For example, certain areas near the head end portion 166, such as the first interior region 534 (e.g., near the outer regions of the flame 533), may have an actual combustion equivalence ratio of greater than 1.0, such as about 1.2, 1.5, 1.7, 2.0, 2.2, 2.5, or more. Combustion at such high equivalence ratios may result in relatively high emissions levels of soot and ammonium.

Unfortunately, because gas turbine engines in accordance with the present disclosure are run substantially continuously during normal operation, it may not be appropriate to slowly release fuel 70 into the head end 166 to lean-out the combustion, as this may reduce the overall output of the gas turbine engine 150, thereby potentially causing the gas turbine engine 150 to not provide its intended power. Instead of performing this type of action, the control system 100 of the present disclosure may reduce the equivalence ratio (e.g., fuel rich) occurring near the head end portion 166 of the combustor 160, but cause a portion of the fuel 70 to be offloaded from the head end portion 166 to downstream regions of the combustor 160 by causing predetermined amounts of the fuel 70 to be introduced to the combustor 160 using the second fuel stream 526.

More specifically, the control system 100 may perform control actions that cause the second fuel stream 526 to be delivered to the one or more fuel injectors 528 along one or more flow paths 540 (e.g., conduits, flow lines, circuits). Respective flow control valves 542 may be disposed on the one or more flow paths 540 to enable control of the fuel flow to the injectors 528. The control system 100 may control a respective position of the one or more valves 542 (e.g., by sending a control signal) to adjust the flow rate (or quantity) of the fuel 70 flowing to the respective one or more fuel injectors 528. Each of the valves 542 may be independently controlled by the control system 100 such that each of the fuel injectors 528 may be separately activated, deactivated, or otherwise adjusted to inject the fuel 70 at an individually or collectively controlled rate.

The control system 100 may cause adjustment of any of the features noted above (e.g., flow control valves, flow diverters, flow regulators) to cause the fuel 70 to be split between the first fuel stream 524, supplied to the one or more fuel nozzles 164 in the head end portion 166, and the second fuel stream 526, supplied to the one or more fuel injectors 528 downstream of the head end portion 166. In addition, the control system 100 may control distribution of the second fuel stream 526 among the one or more fuel injectors 528. For example, the fuel 70 may be split between the first fuel stream 518 and the second fuel stream 520 in any suitable amount. For example, the amount of the fuel 70 provided to the combustor 160 by the first fuel stream 524 and the amount of the fuel 70 provided to the combustor 160 by the second fuel stream 526 may have a range of relative ratios. By way of non-limiting example, the ratios may range from 100:0, where all of the fuel 70 is provided by the first fuel stream 524 and none is provided by the second fuel stream 526, to 0:100, where all of the fuel 70 is provided by the second fuel stream 526 and none is provided by the first fuel stream 524. Generally and by way of non-limiting example, such ratios of the amount of fuel 70 provided by the first fuel stream 524 to the amount of fuel 70 provided by the second fuel stream 526 may include ranges of approximately 100:0 to 70:30, 95:5 to 75:25, or 90:10 to 80:20. Indeed, ratios in these ranges may be particularly useful in reducing soot production when the combustor 160 is operated at equivalence ratios ranging from 0.95 to 1.05, with approximately 90:10 to 80:20 being particularly useful for this purpose. However, all ratios and ranges of ratios falling between 100:0 and 0:100 are within the scope of the present disclosure.

That is, the amount of the fuel 70 provided by the first stream of fuel 524 may represent between 100% and 0%, 99% and 1%, 98% and 2%, 97% and 3%, 95% and 5%, 93% and 7%, 90% and 10%, 88% and 12%, 85% and 15%, 83% and 17%, 80% and 20%, 78% and 22%, 75% and 25%, 70% and 30%, 65% and 35%, 60% and 40%, or 55% and 45% of the total fuel 70. In certain embodiments, the second fuel stream 520 is controlled to be between about 10% and 20% of the fuel 70. Because at least a portion of the fuel 70 is offloaded from the head end portion 166, the equivalence ratio of combustion about the head end portion 166 (e.g., in the first interior region 534) may be reduced, thereby reducing the level of soot and/or ammonium produced in the combustor 160.

The presently disclosed control system may, in certain embodiments, control of the split of the fuel 70 (e.g., between the first and second fuel streams 524, 526, among the second fuel stream 526 into the one or more fuel injectors 528) based on measured levels of soot and/or ammonium in the exhaust gas 60 produced from the SEGR gas turbine system 52 (e.g., as sensor feedback 130 of FIG. 2). To provide such measurements, as illustrated, a sensing system 543 including one or more sensors 544 may be disposed on and/or in the combustor 160, disposed downstream of the combustor 160 and within a flow path of the exhaust gas 60 (e.g., exiting the combustor 160, or exiting the exhaust outlet 182), or any other position suitable for measuring soot and/or other byproduct concentrations controllable using the disclosed techniques. The sensing system 543 may be configured to monitor, for example, a mass, volume, density, flux, pressure (e.g., partial pressure), or the like, of the soot, ammonium, or other byproduct in the exhaust gas 60. The sensors 544 may be any type of sensor suitable for performing such monitoring, such as oxygen sensors (e.g., lambda sensors), flow meters, pressure transducers, thermometers, densitometers, particulate measurement devices, or the like.

The control system 100 may process the sensor feedback 130 received from the sensors 544 and may send control signals to various flow control and distribution devices (e.g., the three-way valve 522, the one or more valves 542) for controlling the split of the fuel 70 based on the sensor feedback 130. For example, based on the measured emissions level of the soot and/or ammonium by the sensor 544, the control system 100 may control the three-way valve 522 to adjust the distribution of the fuel 70 between the first and the second fuel streams 524, 526. In certain embodiments, by controlling the three-way valve 522 to increase the percentage of the second fuel stream 526 from about 0% to 20%, the emissions level of the soot and/or ammonium (e.g., monitored by the sensor 544) may be reduced. In addition, based on the measured emissions level of the soot and/or ammonium by the sensors 544, the control system 100 may control the one or more valves 542 and/or activation of the fuel injectors 528 to adjust the distribution of the second fuel stream 526 among the one or more fuel injectors 528.

In certain embodiments where multiple fuel injectors 528 are utilized, the soot and/or ammonium production (e.g., monitored by the sensors 544) may be reduced by controlling the respective multiple valves 542 to have certain fuel schemes. As an example, certain of the fuel injectors 528 may be activated while others may be deactivated by the control system 100 to achieve predetermined combustion equivalence ratio patterns within the chamber 494. Similarly, the control system 100 may operate certain of the fuel injectors 528 with higher flow rates than others, including situations where both the high and low flow rates are positive flow rates of the fuel 70 through the fuel injectors 528 (e.g., are non-zero flow rates).

Figure 6:
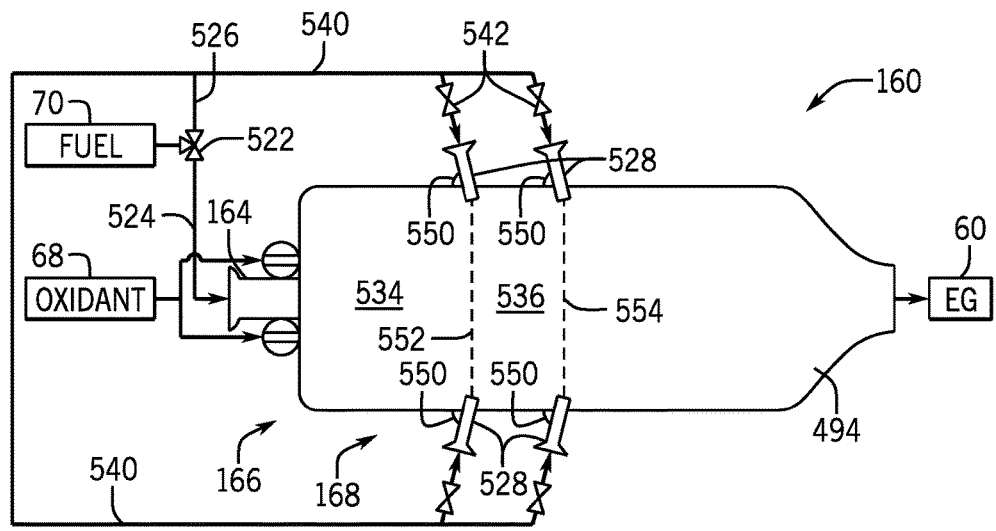
FIG. 6 is a cross-sectional view of an embodiment of a combustor that includes multiple fuel injectors in accordance with the present disclosure.

FIG. 6 schematically illustrates a cross-section of an embodiment of the combustor 160 that includes multiple fuel injectors 528 in accordance with the present disclosure. As illustrated, the combustor 160 includes four fuel injectors 528 disposed downstream of the head end portion 166. However, it should be noted that the combustor 160 may include any number of the fuel injectors 528, such as 1, 2, 3, 4, 5, 6, 7, 8, or more. Each of the fuel injectors 528 is coupled to the combustor with an angle 550 with respect to the wall (e.g., the first wall 496, or the second wall 498) of the combustor 160. The angle 550 may have any suitable value, such as between about 30° and 150°, 45° and 135°, 60° and 120°, 75° and 105°, 80° and 100°, or 85° and 95°. Each of the fuel injectors 528 may have the same or different value of the angle 550. The angle 550 may be fixed or variable for each of the fuel injectors 528. For example, in one presently contemplated embodiment, the fuel injectors 528 may be coupled to various actuators, servomechanisms, or the like, to adjust their angle and thereby control, with further precision, the injection of the fuel 70 into various zones within the combustor 160. In some embodiments, the angle 550 for each of the fuel injectors 528 may be adjusted by the control system 100 based on the sensor feedback 130 corresponding to measurements of the soot and/or ammonium in the exhaust gas 60 for reducing the soot and/or ammonium emissions.

As illustrated, the four fuel injectors 528 are disposed at two axial locations of the combustor 160 about the second interior region 536. That is, the four fuel injectors 528 are disposed around first and second peripheries 552, 554 at different axial locations of the combustor 160. However, it should be noted that the multiple fuel injectors 528 may be disposed at one, two, three, or more axial locations of the combustor 160. In addition, where multiple fuel injectors 528 are disposed around a perimeter or periphery (e.g., circumference) of the combustor 160, the fuel injectors 528 may be spaced substantially evenly or unevenly from one another. Also, where multiple fuel injectors 528 are disposed at multiple axial locations (e.g., stages) of the combustor 160, the fuel injectors 528 may be in-line and/or staggered with respect to one another. For example, the fuel injectors 528 may be positioned at different radial locations when viewed along the longitudinal direction of the combustor 160. Such configurations may be desirable, for example, to position the fuel injectors 528 in a manner that favors introduction of the fuel 70 along a predetermined or modeled flow of the oxidant 68, fuel 70, and/or combustion products within the combustor 160. In this regard, the control system 100 may control an actuation system so as to adjust the fuel injectors 528 according to a modeled and/or measured flow path of any one or a combination of these components.

Figure 7:
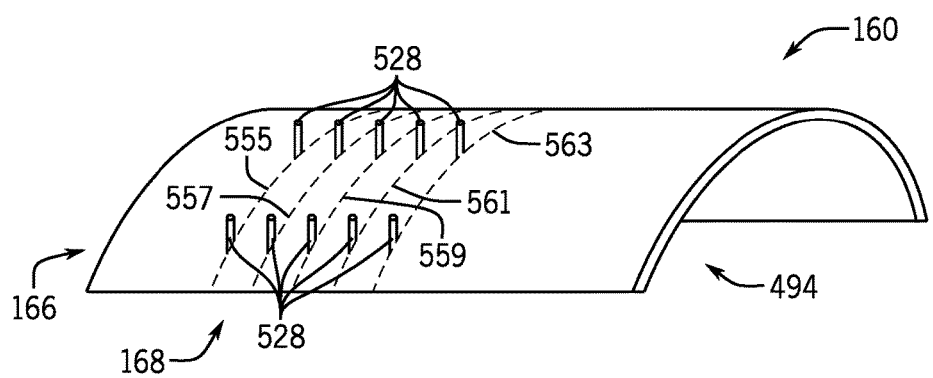
FIG. 7 is a perspective view of an embodiment of a combustor that includes multiple fuel injectors in accordance with the present disclosure.
Figure 8:
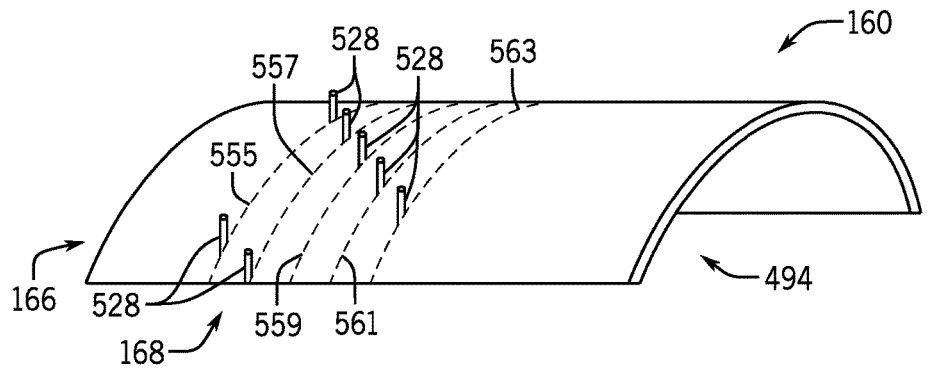
FIG. 8 a perspective view of an embodiment of a combustor that includes multiple fuel injectors in accordance with the present disclosure.

In view of the foregoing, in a general sense, the one or more fuel injectors 528 may be configured to inject the fuel 70 (e.g., the second fuel stream 526) in any one of a single axial stage, multiple axial stages, a single axial peripheral (e.g., circumferential) stage, or multiple axial peripheral (e.g., circumferential) stages (e.g., different axial and radial positions). To help illustrate such configurations, FIG. 7 depicts an embodiment of the combustor 160 that includes multiple fuel injectors 528 disposed in-line with one another at multiple axial locations (e.g., stages) of the combustor 160. As illustrated, the multiple fuel injectors 528 are disposed around peripheries 555, 557, 559, 561, 563 at different axial locations. One or more fuel injectors 528 may be disposed on each of the peripheries 555, 557, 559, 561, 563. In addition, the fuel injectors 528 from the peripheries 555, 557, 559, 561, 563 are substantially aligned with one another (e.g., have substantially the same radial position). Also, other relative positions for the fuel injectors 528 may be used. For example, FIG. 8 illustrates another embodiment of the combustor 160 that includes multiple fuel injectors 528 disposed staggered with one another at multiple axial locations (e.g., stages) of the combustor 160. As illustrated, the multiple fuel injectors 528 are disposed around peripheries 555, 557, 559, 561, 563 at different axial locations. One or more fuel injectors 528 may be disposed on each of the peripheries 555, 557, 559, 561, 563. In addition, the fuel injectors 528 from the peripheries 555, 557, 559, 561, 563 are staggered with respect to one another (e.g., are located at different radial positions of the combustor 160).

During operation of the SEGR gas turbine system 52, each of the fuel injectors 528 may be collectively or individually activated or deactivated (e.g., via the one or more valves 542 controlled by the control system 100) so as to introduce the fuel 70 from a single axial stage, from multiple axial stages, from a single axial peripheral stage, or from multiple axial peripheral stages. The control system 100 may determine whether to make such adjustments based on, for example, desired combustion equivalence ratios, based on sensor feedback 130, based on modeling outputs using the same, and so forth, to discourage the formation of soot and/or ammonium during combustion. Using the components described in detail above, a variety of control and logic schemes may be envisioned to control soot and/or ammonium (or other byproduct) formation using the axial fuel staging disclosed herein.

Figure 9:
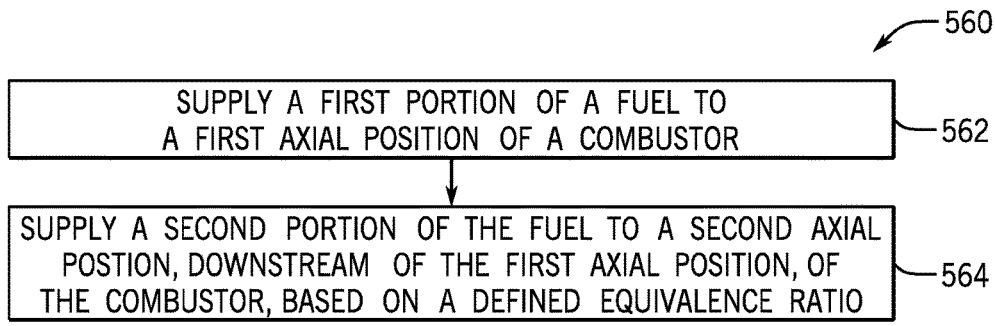
FIG. 9 is flow diagram of a method for controlling combustion within a combustor at a defined equivalence ratio using fuel staging, in accordance with the present disclosure.

To illustrate one example, FIG. 9 is a flow diagram of an embodiment of a method 560 for controlling combustion within the combustor 160 at a defined equivalence ratio using fuel staging, in accordance with the present disclosure. The method 560 may be performed by the components described above, with various determinations, comparisons, control actions, and so forth, being performed by the control system 100. In the illustrated embodiment, the method 560 includes supplying a first portion (e.g., the first fuel stream 524) of the fuel 70 to a first axial position of the combustor 160 (block 562). As discussed above, the first axial position of the combustor 160 may be at the head end portion 166 of the combustor 160. Specifically, the first axial position may correspond to the position where the fuel 70 is injected into the combustor 160 from the fuel nozzles 164 coupled to the head end portion 166. Again, the flow rate, quantity, and the percentage of the first fuel stream 524 with respect to the total amount of the fuel 70 provided to the combustor 160 may be adjusted by the control system 100 using various flow regulation and distribution devices (e.g., the three-way valve 522). While performing the acts in accordance with block 562, the control system 100 may also control a supply of the exhaust gas 170, the oxidant 68, and the one or more diluents 510 into the combustor 160 (e.g., at the first interior region 534) via the one or more fuel nozzles 164, or other injector features, in the head end portion 166.

Based on the defined equivalence ratio for the overall combustion within the combustor 160, the control system 100 may control to supply a second portion (e.g., the second fuel stream 526) of the fuel 70 to a second axial position, downstream of the first axial position, of the combustor 160 (block 564). As discussed above, the second axial position of the combustor 160 may be about the second interior region 536 of the combustor 160. The second fuel stream 526 may be supplied to the combustor 160 via the one or more fuel injectors 528 coupled to the combustor 160 downstream of the head end portion 166. The flow rate, quantity, and the percentage of the second fuel stream 526 with respect to the fuel 70 may be controlled by the control system 100 using, for example, the three-way valve 522, and/or other flow regulation and/or distribution devices as described above. For instance, the activation/deactivation of the one or more fuel injectors 528, including the respective flow rate of the fuel 70 therethrough, may be controlled by the control system 100 using the one or more flow control valves 542.

As noted above, the amount of the fuel 70 provided to the combustor 160 via the second fuel stream 526 may depend on a desired equivalence ratio and the amount of fuel 70 provided to the combustor 160 via the first fuel stream 524, among other considerations. For example, based on the defined equivalence ratio, the control system 100 may adjust the distribution of the fuel 70 between the first and the second fuel streams 542, 526. For example, if the combustor 160 is controlled to operate at substantially stoichiometric conditions (e.g., with the equivalence ratio about 1.0), the control system 100 may adjust the three-way valve 522 to offload a portion of the fuel 70 from the head end portion 166 to the downstream portions (e.g., about the second interior region 536), thereby discouraging the formation of certain byproducts (e.g., soot and/or ammonium).

Figure 10:
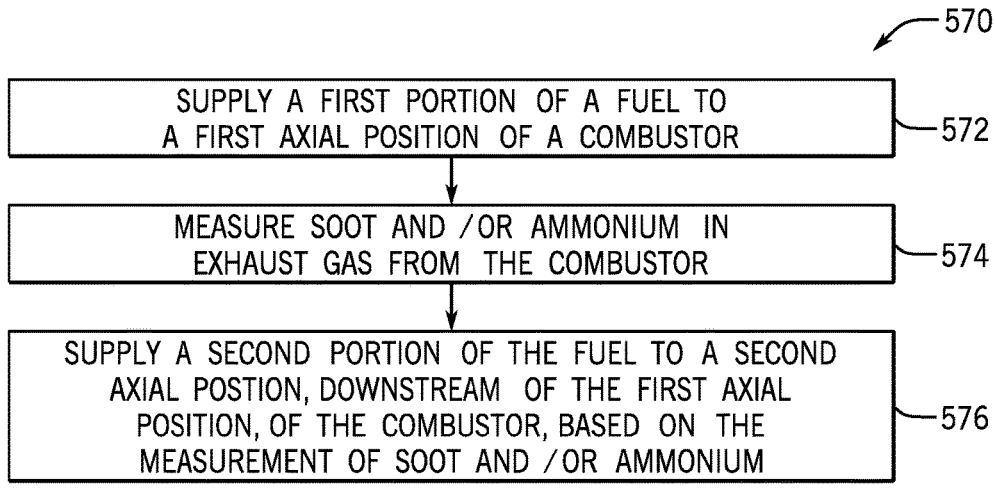
FIG. 10 is a flow diagram of a method for controlling fuel staging in a combustor based on measured emissions level of soot and/or ammonium in an exhaust gas from the combustor, in accordance with the present disclosure.

The control system 100 may also perform various control functions based on the sensor feedback 130 and/or other measurements, as noted above. FIG. 10 is a flow diagram of an embodiment of a method 570 for controlling fuel staging in the combustor 160 based on soot and/or ammonium measurements in an exhaust gas from the combustor 160, in accordance with the present disclosure. Again, the method 570 may be performed by the components described above, with various determinations, comparisons, control actions, and so forth, being performed by the control system 100. In the illustrated embodiment, the method 570 includes supplying a first portion (e.g., the first fuel stream 524) of the fuel 70 to a first axial position (e.g., the head end portion 166) of the combustor 160 (e.g., via the one or more fuel nozzles 164) (block 572), in a similar manner as set forth above with respect to the method 560. At the same time, the control system 100 may control a supply of the exhaust gas 170, the oxidant 68, and the one or more diluents 510 into the combustor 160 (e.g., at the first interior region 534) via the one or more fuel nozzles 164 in the head end portion 166.

A sensor system having one or more sensors (e.g., the sensor 544 of the sensing system 543) may be coupled to the exhaust gas form the combustor 160 (e.g., the exhaust gas 60), and the control system 100 may obtain measurements relating to the soot and/or ammonium emissions in the exhaust gas (block 574). Again, these measurements may relate to pressure, flow rate, mass flow, density, temperature, particle size analysis, and so forth, and may provide direct and/or indirect feedback pertaining to the soot, ammonium, or other byproduct, that the control system 100 may utilize to perform various determinations relating to how the fuel 70 will be split among the various stages.

As noted above, the emissions level of the soot and/or ammonium emissions in the exhaust gas 60 may depend not only on the equivalence ratio for the overall combustion within the combustor 160, but also the equivalence ratio for individual combustion areas within the combustor 160. As such, by decreasing the equivalence ratio of certain areas (e.g., the first interior region 534 near the head end portion 166 of the combustor 160 via offloading a portion of the fuel 70 from the head end portion 166 to downstream portions (e.g., about the second interior region 536), the overall emissions level of the soot and/or ammonium in the exhaust gas 60 may be reduced.

Accordingly, the control system 100 may control to supply a second portion (e.g., the second fuel stream 526) of the fuel 70 to a second axial position, downstream of the first axial position, of the combustor 160 based on the measurement of the soot and/or ammonium in the exhaust gas from the combustor 160 (block 576). As discussed above, the second axial position of the combustor 160 may be about the second interior region 536 of the combustor 160. The second fuel stream 526 may be supplied to the combustor 160 via the one or more fuel injectors 528 coupled to the combustor 160 downstream of the head end portion 166. The flow rate, quantity, and the percentage of the second fuel stream 526 with respect to the fuel 70 may be controlled by the control system 100 using, for example, the three-way valve 522, and/or other flow regulation and/or distribution devices as described above, based on the measurement of the soot and/or ammonium in the exhaust gas from the combustor 160. In addition, the activation/deactivation of the one or more fuel injectors 528, including the respective flow rate of the fuel 70 therethrough, may be controlled by the control system 100 using, for example, the one or more valves 542, based on the measurement of the soot and/or ammonium in the exhaust gas from the combustor 160.

For example, if the sensor feedback 130 (e.g., from the sensor 544 of system 543) indicates that the concentration level of the soot and/or ammonium in the exhaust gas of the combustor 160 is high (e.g., higher than an upper threshold), the control system 100 may control various flow regulation and distribution devices (e.g., the three-way valve 522) to offload a portion of the fuel 70 from the head end portion 166 to the downstream portions (e.g., about the second interior region 536), for example, to be injected into the combustor 160 by the one or more fuel injectors 528. As some portion of the fuel 70 (e.g., the second fuel stream 526) is injected by the one or more fuel injectors 528, the feedback 130 may indicate that the concentration level of the soot and/or the ammonium in the exhaust gas is reduced. The control system 100 may control the parameters of the second fuel stream 526 (e.g., flow rate, quantity, temperature, pressure, and the like) based on the change of the concentration levels of the soot and/or ammonium as indicated by the sensor feedback 130. For example, the control system 100 may increase the flow rate of the second fuel stream 526 relative to the first fuel stream 524 if the sensor feedback 130 indicates that a detected decrease of the concentration level of the soot and/or ammonium is smaller than a desired decrease (i.e., the actual reduction in their concentration is smaller than a target reduction).

On the other hand, the control system 100 may decrease the flow rate of the second fuel stream 526 relative to the first fuel stream 524 if the sensor feedback 130 indicates there has been a greater decrease of the concentration level of the soot and/or ammonium than is desired, or if other combustion parameters are not within desired specifications. If the sensor feedback 130 (e.g., from the sensor 544 of system 543) indicates that the concentration level of the soot and/or ammonium in the exhaust gas of the combustor 160 is low (e.g., lower than an lower threshold), which may suggest a relatively higher oxygen concentration in the exhaust gas of the combustor 160, the control system 100 may control various flow regulation and distribution devices (e.g., the three-way valve 522) to decrease the portion (e.g., the second fuel stream 526) of the fuel 70 delivered at the downstream portions (e.g., about the second interior region 536 via the one or more fuel injectors 528) and increase the portion (e.g., the first fuel stream 524) of the fuel 70 delivered at the head end portion 166 (e.g., via the one or more fuel nozzles 164).

This written description uses examples to disclose the embodiments, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Additional Description

The present embodiments provide a system and method for cooling and decelerating discharge flows from probes coupled to a gas turbine system. It should be noted that any one or a combination of the features described above may be utilized in any suitable combination. Indeed, all permutations of such combinations are presently contemplated. By way of example, the following clauses are offered as further description of the present disclosure:

Embodiment 1

A gas turbine system includes a turbine combustor. The turbine combustor includes one or more first fuel injectors coupled to a head end of the turbine combustor and configured to deliver a first portion of a fuel to a first axial position of a combustion section of the turbine combustor. The turbine combustor also includes one or more second fuel injectors coupled to the turbine combustor axially downstream of the head end. The one or more second fuel injectors are configured to deliver a second portion of the fuel to a second axial position of the combustion section of the turbine combustor, the second axial position being downstream of the first axial position. The gas turbine system also includes an oxidant supply system configured to provide an oxidant to a head end of the combustion section of the turbine combustor. The gas turbine system also includes a fuel supply system configured to supply the fuel to the one or more first and second fuel injectors. The gas turbine system also includes a controller configured to cause the one or more first fuel injectors to deliver the first portion of the fuel such that combustion of the fuel and oxidant at the first axial position is oxidant-rich, and to cause the one or more second fuel injectors to deliver the second portion of the fuel such that combustion of the fuel and oxidant within the overall combustion section of the turbine combustor is at a defined equivalence ratio.

Embodiment 2

The gas turbine system of embodiment 1, wherein the gas turbine system includes a flow distributor coupled to the fuel supply system, wherein the controller is configured to control the flow distributor to adjust a ratio of the first portion to the second portion of the fuel, while maintaining the combustion of the fuel and oxidant at the defined equivalence ratio.

Embodiment 3

The gas turbine system of any preceding embodiment, wherein the gas turbine system includes one or more valves coupled to the respective one or more second fuel injectors, wherein the controller is configured to control the one or more valves to adjust respective fuel flow rates of the one or more second fuel injectors.

Embodiment 4

The gas turbine system of any preceding embodiment, wherein the turbine combustor comprises one or more diluent injectors disposed downstream of the head end of the turbine combustor and configured to inject a diluent into the turbine combustor, and at least one of the one or more second fuel injectors is coupled to the one or more diluent injectors.

Embodiment 5

The gas turbine system of any preceding embodiment, wherein the defined equivalence ratio is between 0.95 and 1.05.

Embodiment 6

The gas turbine system of embodiment 5, wherein the controller is configured to cause the second portion of the fuel to correspond to between approximately 10% and 20% of a total amount of the fuel provided to the turbine combustor by the first and second portions.

Embodiment 7

The gas turbine system of any preceding embodiment, wherein the gas turbine system includes a sensor configured to measure a parameter of soot and/or ammonium in an exhaust gas from the turbine combustor.

Embodiment 8

The gas turbine system of embodiment 7, wherein the controller is configured to adjust a ratio of the first portion to the second portion of the fuel based on the measured parameter of the soot and/or ammonium.

Embodiment 9

The gas turbine system of any preceding embodiment, wherein the one or more second fuel injectors are configured to deliver the second portion of the fuel in any one or more of a single axial stage, multiple axial stages, a single axial circumferential stage, and multiple axial circumferential stages.

Embodiment 10

The gas turbine system of any preceding embodiment, wherein the gas turbine system includes a turbine driven by combustion gases from the turbine combustor, wherein the turbine outputs an exhaust gas generated from the combustion gases, and an exhaust gas compressor driven by the turbine, wherein the exhaust gas compressor is configured to compress and route the exhaust gas to the turbine combustor.

Embodiment 11

The gas turbine system of embodiment 10, wherein the gas turbine system is a stoichiometric exhaust gas recirculation (SEGR) gas turbine engine.

Embodiment 12

The gas turbine system of embodiment 11, wherein the gas turbine system includes an exhaust gas extraction system coupled to the gas turbine system, and a hydrocarbon production system coupled to the exhaust gas extraction system.

Embodiment 13

A method includes supplying a first portion of a fuel to a first axial position of a combustion section of a turbine combustor via one or more first fuel injectors coupled to a head end of the turbine combustor. The method also includes measuring a parameter of soot and/or ammonium in an exhaust gas from the turbine combustor using one or more sensors disposed along a flow path of the exhaust gas. The method also includes supplying a second portion of the fuel to a second axial position of the combustion section of the turbine combustor via one or more second fuel injectors coupled to the turbine combustor and positioned axially downstream of the head end and the first axial position. The second portion is determined by a controller based on the measured parameter of the soot and/or ammonium.

Embodiment 14

The method of embodiment 13, wherein the method includes adjusting, with the controller, a ratio of the first portion to the second portion of the fuel based on the measured parameter of the soot and/or ammonium.

Embodiment 15

The method of embodiments 13 or 14, wherein the method includes supplying an oxidant to a head end of the combustion section of the turbine combustor at a controlled rate using the controller.

Embodiment 16

The method of embodiments 13, 14, or 15, wherein the method includes adjusting, using the controller, a ratio of the first portion to the second portion of the fuel based on a defined combustion equivalence ratio of the fuel and oxidant within the overall combustion section of the turbine combustor.

Embodiment 17

The method of embodiments 13, 14, 15, or 16, wherein supplying the second portion of the fuel comprises controlling an independent fuel flow rate to each of the one or more second fuel injectors.

Embodiment 18

The method of embodiments 13, 14, 15, 16, or 17, wherein supplying the second portion of the fuel comprises supplying the second portion of the fuel via at least one of the one or more second fuel injectors coupled to a diluent injector disposed downstream of the head end of the turbine combustor.

Embodiment 19

The method of embodiments 13, 14, 15, 16, 17, or 18, wherein supplying the second portion of the fuel comprises supplying the second portion of the fuel in an amount that is between approximately 10% and 20% of a total amount of the fuel provided to the turbine combustor by the first and second portions, while maintaining a combustion equivalence ratio of between 0.95 and 1.05 for the turbine combustor as a whole.

Embodiment 20

A system includes a controller. The controller includes one or more tangible, non-transitory, machine-readable media collectively storing one or more sets of instructions. The controller also includes one or more processing devices configured to execute the one or more sets of instructions to supply a first portion of a fuel to a first axial position of a combustion section of a turbine combustor via one or more first fuel injectors coupled to a head end of the turbine combustor; obtain a parameter of soot and/or ammonium in an exhaust gas from the turbine combustor; and supply a second portion of the fuel to a second axial position of the combustion section of the turbine combustor via one or more second fuel injectors coupled to the turbine combustor axially downstream of the head end based on the measured parameter of the soot and/or ammonium. The second axial position is downstream of the first axial position.

Embodiment 21

The system of embodiment 20, wherein the one or more processing devices are configured to execute the one or more sets of instructions to adjust a ratio of the first portion to the second portion of the fuel based on the parameter of the soot and/or ammonium.

Embodiment 22

The system of embodiments 20 or 21, wherein the one or more processing devices are configured to execute the one or more sets of instructions to supply an oxidant to a head end of the combustion section of the turbine combustor and to adjust a ratio of the first portion to the second portion of the fuel based on a defined combustion equivalence ratio of the fuel and oxidant within the overall combustion section of the turbine combustor.

Embodiment 23

The system of embodiments 20, 21 or 22, wherein the one or more processing devices are configured to execute the one or more sets of instructions to control an independent fuel flow rate to each of the one or more second fuel injectors.

Embodiment 24

The system of embodiments 20, 21, 22, or 23, wherein the one or more processing devices are configured to execute the one or more sets of instructions to cause the second portion of the fuel to be supplied via at least one of the one or more second fuel injectors th coupled to a diluent injector disposed downstream of the head end of the turbine combustor.

Embodiment 25

The system of embodiments 20, 21, 22, 23, or 24, wherein the one or more processing devices are configured to execute the one or more sets of instructions to supply the second portion of the fuel in an amount between approximately 10% and 20% of a total amount of the fuel provided to the turbine combustor by the first and second portions, while maintaining a combustion equivalence ratio of between 0.95 and 1.05 for the turbine combustor as a whole.

The invention claimed is:
1. A gas turbine system comprising:
a turbine combustor, comprising:
one or more first fuel injectors coupled to a head end of the turbine combustor and configured to deliver a first portion of a fuel to a first axial position of a combustion section of the turbine combustor; and
one or more second fuel injectors coupled to the turbine combustor axially downstream of the head end, wherein the one or more second fuel injectors are configured to deliver a second portion of the fuel to a second axial position of the combustion section of the turbine combustor, the second axial position being downstream of the first axial position;
an oxidant supply system configured to provide an oxidant to the head end of the turbine combustor;
a fuel supply system configured to supply the fuel to the one or more first and second fuel injectors;
a sensor configured to measure a parameter of soot and/or ammonium in an exhaust gas from the turbine combustor; and
a controller configured to cause the one or more first fuel injectors to deliver the first portion of the fuel such that combustion of the fuel and oxidant at the first axial position is oxidant-rich, and to cause the one or more second fuel injectors to deliver the second portion of the fuel such that combustion of the fuel and oxidant within the overall combustion section of the turbine combustor is at a defined equivalence ratio between 0.95 and 1.05, wherein the second portion of the fuel corresponds to between 5% and 30% of a total amount of the fuel provided to the turbine combustor by the first portion and the second portion, and the controller is configured to adjust a ratio of the first portion to the second portion of the fuel based on the measured parameter of the soot and/or ammonium.

2. The gas turbine system of claim 1, comprising a flow distributor coupled to the fuel supply system, wherein the controller is configured to control the flow distributor to adjust a ratio of the first portion to the second portion of the fuel, while maintaining the combustion of the fuel and oxidant at the defined equivalence ratio.

3. The gas turbine system of claim 1, comprising one or more valves coupled to the respective one or more second fuel injectors, wherein the controller is configured to control the one or more valves to adjust respective fuel flow rates of the one or more second fuel injectors.

4. The gas turbine system of claim 1, wherein the turbine combustor comprises one or more diluent injectors disposed downstream of the head end of the turbine combustor and configured to inject a diluent into the turbine combustor, and at least one of the one or more second fuel injectors is coupled to the one or more diluent injectors.

5. The gas turbine system of claim 1, wherein the controller is configured to cause the second portion of the fuel to correspond to between 10% and 20% of the total amount of the fuel provided to the turbine combustor by the first and second portions.

6. The gas turbine system of claim 1, wherein the one or more second fuel injectors are configured to deliver the second portion of the fuel in any one or more of a single axial stage, multiple axial stages, a single axial circumferential stage, and multiple axial circumferential stages.

7. The gas turbine system of claim 1, comprising:
a turbine driven by combustion gases from the turbine combustor, wherein the turbine outputs an exhaust gas generated from the combustion gases; and
an exhaust gas compressor driven by the turbine, wherein the exhaust gas compressor is configured to compress and route the exhaust gas to the turbine combustor.

8. The gas turbine system of claim 7, wherein the gas turbine system is a stoichiometric exhaust gas recirculation (SEGR) gas turbine engine.

9. The gas turbine system of claim 8, comprising an exhaust gas processing system coupled to the gas turbine system, and a hydrocarbon production system coupled to the exhaust gas extraction system.

10. A method comprising:
supplying a first portion of a fuel to a first axial position of a combustion section of a turbine combustor via one or more first fuel injectors coupled to a head end of the turbine combustor, wherein the one or more first fuel injectors are configured to receive the first portion of the fuel from a fuel supply system, and wherein a controller is configured to cause the one or more first fuel injectors to deliver the first portion of the fuel such that combustion of the fuel and an oxidant at the first axial position is oxidant-rich;
measuring a parameter of soot and/or ammonium in an exhaust gas from the turbine combustor using one or more sensors disposed along a flow path of the exhaust gas;
supplying a second portion of the fuel to a second axial position of the combustion section of the turbine combustor via one or more second fuel injectors coupled to the turbine combustor and positioned axially downstream of the head end and the first axial position, wherein the second portion is determined by the controller based on the measured parameter of the soot and/or ammonium, wherein the one or more second fuel injectors are configured to receive the second portion of the fuel from the fuel supply system, and wherein the controller is configured to cause the one or more second fuel injectors to deliver the second portion of the fuel such that combustion of the fuel and the oxidant within an overall combustion section of the turbine combustor is at a defined equivalence ratio between 0.95 and 1.05;
supplying an oxidant from an oxidant supply system to the head end of the combustion section of the turbine combustor at a controlled rate using the controller; and
adjusting, with the controller, a ratio of the first portion to the second portion of the fuel based on the measured parameter of the soot and/or ammonium and on the defined combustion equivalence ratio of the fuel and oxidant within the overall combustion section of the turbine combustor, and wherein the second portion of the fuel corresponds to between 5% and 30% of a total amount of the fuel provided to the turbine combustor by the first portion and the second portion.

11. The method of claim 10, wherein supplying the second portion of the fuel comprises controlling an independent fuel flow rate to each of the one or more second fuel injectors.

12. The method of claim 10, wherein supplying the second portion of the fuel comprises supplying the second portion of the fuel via at least one of the one or more second fuel injectors coupled to a diluent injector disposed downstream of the head end of the turbine combustor.

13. The method of claim 10, wherein supplying the second portion of the fuel comprises supplying the second portion of the fuel in an amount that is between approximately 10% and 20% of the total amount of the fuel provided to the turbine combustor by the first and second portions, while maintaining a combustion equivalence ratio of between 0.95 and 1.05 for the turbine combustor as a whole.

* * * * *